US008108250B1

(12) United States Patent
Moore et al.

(10) Patent No.: US 8,108,250 B1
(45) Date of Patent: Jan. 31, 2012

(54) METHOD AND APPARATUS FOR PROVIDING A BUSINESS TOOL

(75) Inventors: Larry Creston Moore, Los Altos, CA (US); Cecil J Bullard, Ogden, UT (US); Micheal Kent Shallop, San Jose, CA (US)

(73) Assignee: Intelligent Business Tools, Mountain View, CA (US)

( * ) Notice: Subject to any disclaimer, the term of this patent is extended or adjusted under 35 U.S.C. 154(b) by 1227 days.

(21) Appl. No.: 11/650,366

(22) Filed: Jan. 5, 2007

(51) Int. Cl.
*G06Q 10/00* (2006.01)

(52) U.S. Cl. ............... 705/7.42; 705/7.38; 705/7.39; 700/111

(58) Field of Classification Search ........ 705/7.11–7.42; 345/440; 700/111
See application file for complete search history.

(56) References Cited

U.S. PATENT DOCUMENTS

| | | | | |
|---|---|---|---|---|
| 5,490,097 A * | 2/1996 | Swenson et al. | ................... | 703/2 |
| 5,630,069 A * | 5/1997 | Flores et al. | ..................... | 705/7 |
| 5,799,297 A * | 8/1998 | Goodridge et al. | ................... | 1/1 |
| 6,225,998 B1 * | 5/2001 | Okita et al. | ................... | 715/853 |
| 6,385,621 B1 * | 5/2002 | Frisina | ................... | 1/1 |
| 6,681,197 B2 * | 1/2004 | Brunner et al. | ............... | 702/182 |
| 6,990,461 B2 * | 1/2006 | Bargnes et al. | ................. | 705/10 |
| 6,995,768 B2 * | 2/2006 | Jou et al. | ....................... | 345/440 |
| 7,031,998 B2 * | 4/2006 | Archbold | ........................ | 709/201 |
| 7,168,045 B2 * | 1/2007 | Fliess et al. | ..................... | 715/771 |
| 7,233,919 B1 * | 6/2007 | Braberg et al. | ................. | 705/32 |
| 7,233,971 B1 * | 6/2007 | Levy | ............................. | 709/203 |
| 7,571,111 B2 * | 8/2009 | Ahrens et al. | .................... | 705/11 |
| 7,571,129 B2 * | 8/2009 | Ebert | ........................... | 705/36 R |
| 2002/0019765 A1 * | 2/2002 | Mann et al. | ..................... | 705/11 |
| 2002/0038217 A1 * | 3/2002 | Young | ............................... | 705/1 |
| 2002/0065702 A1 * | 5/2002 | Caulfield | ........................... | 705/9 |
| 2002/0152148 A1 * | 10/2002 | Ebert | ............................. | 705/35 |
| 2003/0004790 A1 * | 1/2003 | Calderaro et al. | .............. | 705/11 |
| 2003/0050830 A1 * | 3/2003 | Troyer | ............................. | 705/11 |
| 2003/0069773 A1 * | 4/2003 | Hladik et al. | ...................... | 705/7 |
| 2003/0115094 A1 * | 6/2003 | Ammerman et al. | ........... | 705/11 |
| 2003/0171981 A1 * | 9/2003 | Bargnes et al. | .................. | 705/11 |
| 2004/0073442 A1 * | 4/2004 | Heyns et al. | ....................... | 705/1 |
| 2004/0128188 A1 * | 7/2004 | Leither et al. | .................... | 705/11 |
| 2004/0162754 A1 * | 8/2004 | Bargnes et al. | .................. | 705/10 |
| 2004/0260588 A1 * | 12/2004 | Bowen | ............................... | 705/7 |
| 2005/0010456 A1 * | 1/2005 | Chang et al. | ....................... | 705/7 |
| 2005/0043977 A1 * | 2/2005 | Ahern et al. | ....................... | 705/7 |
| 2005/0144102 A1 * | 6/2005 | Johnson | ............................ | 705/35 |
| 2005/0154628 A1 * | 7/2005 | Eckart et al. | .................... | 705/10 |

(Continued)

OTHER PUBLICATIONS

PRTM Press Release "High Tech Management Consultants PRTM Launch Online Benchmarking Company", Mar. 1, 1999, www.prtm.com/pressreleases/1999/03.01 _2 .asp.*

(Continued)

*Primary Examiner* — Lynda Jasmin
*Assistant Examiner* — Alan S Miller
(74) *Attorney, Agent, or Firm* — Blakely, Sokoloff, Taylor & Zafman LLP; Judith A. Szepesi

(57) ABSTRACT

A method and apparatus for business consulting are described. An input interface enables designated personnel to enter data in pseudo-real-time into the system. An analysis logic calculates key values for the business based on the pseudo-real-time data entered and enables the display of the relationship of the key values to projected goals. A user interface provides a visual display of an immediate identification of an overall business state.

25 Claims, 29 Drawing Sheets

NETWORK DIAGRAM

U.S. PATENT DOCUMENTS

| | | | |
|---|---|---|---|
| 2005/0154769 A1* | 7/2005 | Eckart et al. | 707/201 |
| 2005/0216831 A1* | 9/2005 | Guzik et al. | 715/513 |
| 2006/0020509 A1* | 1/2006 | Strain et al. | 705/14 |
| 2006/0129419 A1* | 6/2006 | Flaxer et al. | 705/1 |
| 2006/0149574 A1* | 7/2006 | Bradley et al. | 705/1 |
| 2007/0038627 A1* | 2/2007 | Cohn et al. | 707/8 |
| 2007/0050232 A1* | 3/2007 | Chang et al. | 705/10 |

OTHER PUBLICATIONS

Web.archive.org webpage of May 24, 1998, prtm.com, "Benchmarking Studies by PRTM", pp. 1-4.*

Hakanson, Bill, "Supply-Chain Letter", Supply-Chain Council's Newsletter of Nov. 1998, pp. 1-12.*

PRTM Press Release "The Performance Measurement Group Rolls Out Product Development Benchmarking Online", Jun. 11, 1999, www.prtm.com/pressreleases/1999/06.11 .asp.*

PRTM Press Release "University of Michigan/OSAT and The Performance Measurement Group Launch a New Benchmarking Initiative for the Automotive Industry", Jan. 21, 2000, www.prtm.com|pressreleases|2000101.21 .asp.*

Camp, Robert C, "Benchmarking—The Search for Industry Best Practices that Lead to Superior Pedormance", Copyright 1989, ASQC Quality Press, pp. 3-23, 88-93.*

"TMR News—PRTM Launches Online Benchmarking Company", Apr. 5, 1999, www.lionhrtpub.com|tmr|newsO4991040799-prtm.html.*

The Supply Chain Council's presentation of May 1999, "Supply Chain Operations Reference (SCOR) Model Overview", 31 Slides, weboarchive.org/web/20000511012944 /www.supply-chain.org/html/scor_overview.cfm.*

Fariborz, Partovi, "Determining what to benchmark: An analytic hierarchy process approach", 1994, International Journal of Operations and Production Management, vol. 14, Iss. 6, p. 25, ProQuest ID 878228.*

Bititci, Umit S; Turner, Trevor; Begemann, Carsten; "Dynamics of Performance Measurement Systems", 2000, International Journal of Operations and Production Management, vol. 20, Iss. 6, p. 692, ProQuest ID 115924178.*

"Overview—Introduction to Protractor," http://web.archive.org/web/20040213123655/protractor.com/download_online_help.htm, 7 pages.

"Overview—Work Orders, Invoices and Credits," http://web.archive.org/web/20040213123655/protractor.com/download_online_help.htm, 15 pages.

"Protractor Online Guide," http://web.archive.org/web/20040213123655/protractor.com/download_online_help.htm, 1 page.

Coonradt, Charles A., "*Scorekeeping for Success*," ISBN 1-883004-05-5, Second Edition 2007, The Game of Work L.L.C., Park City, Utah, Chapter 1 (Why Keep Score pp. 10-17), Chapter 4 (The Importance of Feedback pp. 34-39), Chapter 7 (Keep it Positive pp. 56-64), Chapter 20 (Data to Pictures pp. 154-160), Chapter 21 (Line Them Up pp. 162-171), total pages 51.

\* cited by examiner

FIG. 1 NETWORK DIAGRAM

FIG. 2 VARIOUS USERS FOR AN IT CONSULTANCY EMBODIMENT

FIG. 3 VARIOUS USERS FOR AN AUTOMOTIVE INDUSTRY EMBODIMENT

FIG. 5 BLOCK DIAGRAM OF THE BUSINESS INTELLIGENCE SYSTEM

FIG. 6 BUSINESS INTELLIGENCE SYSTEM OVERVIEW

FIG. 7 WORKFLOW FOR WORK ORDER

FIG. 8 EMBODIMENT OF A Business Monitor USING THE SYSTEM

FIG. 9 OPTIMIZATION TOOL

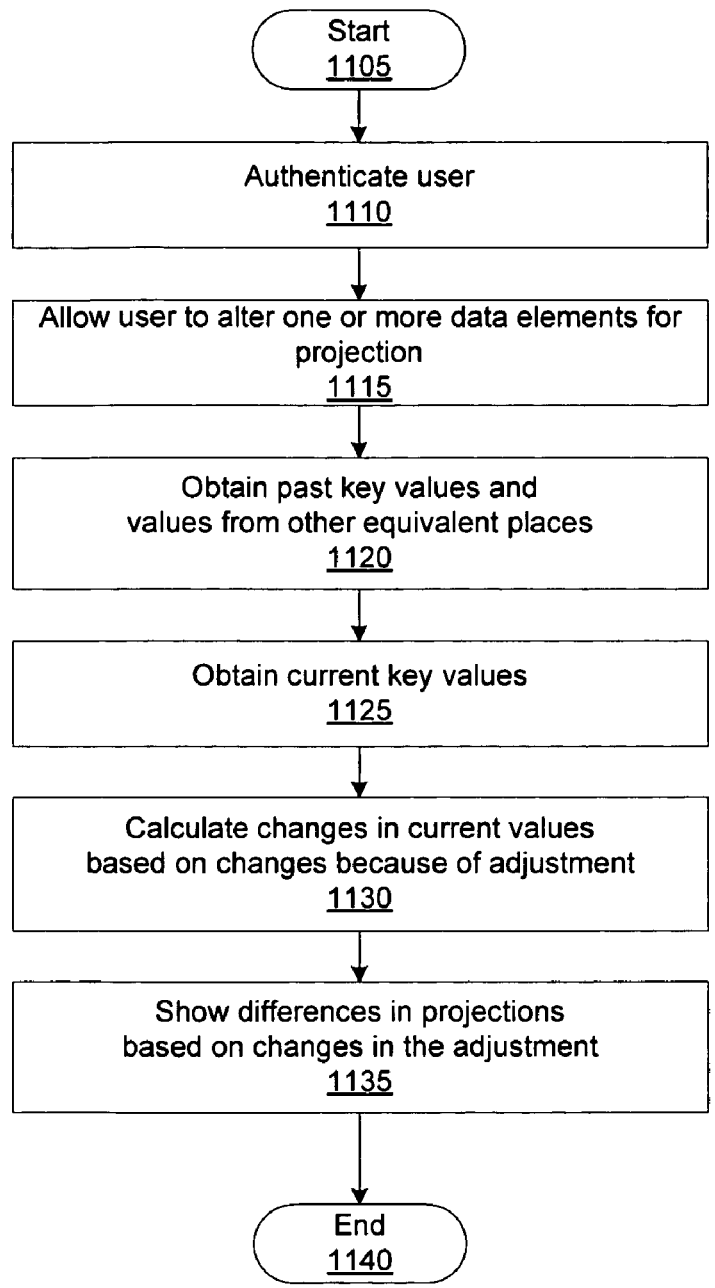
FIG. 11 PROJECTION TOOL

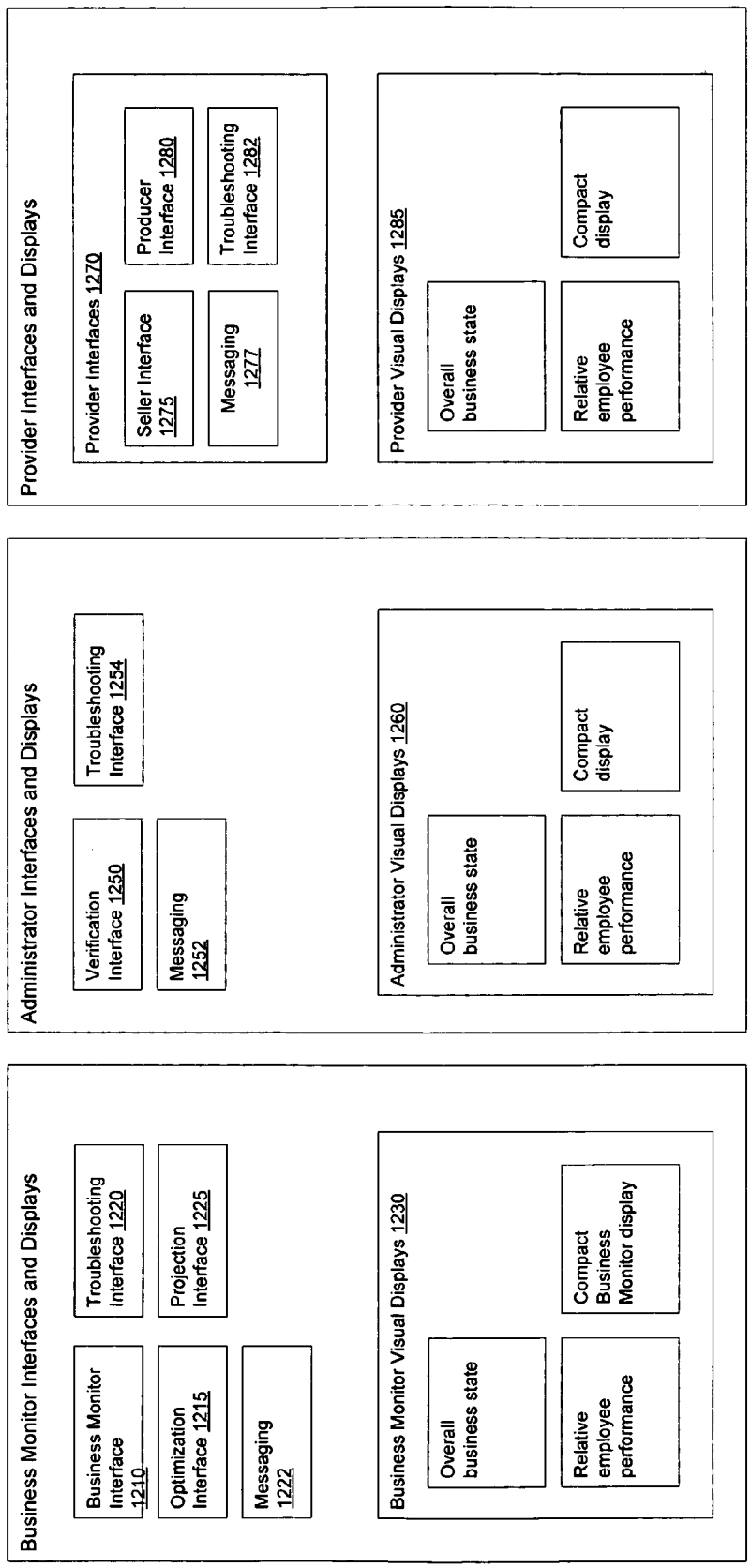
FIG. 12 INTERFACES AND DISPLAYS

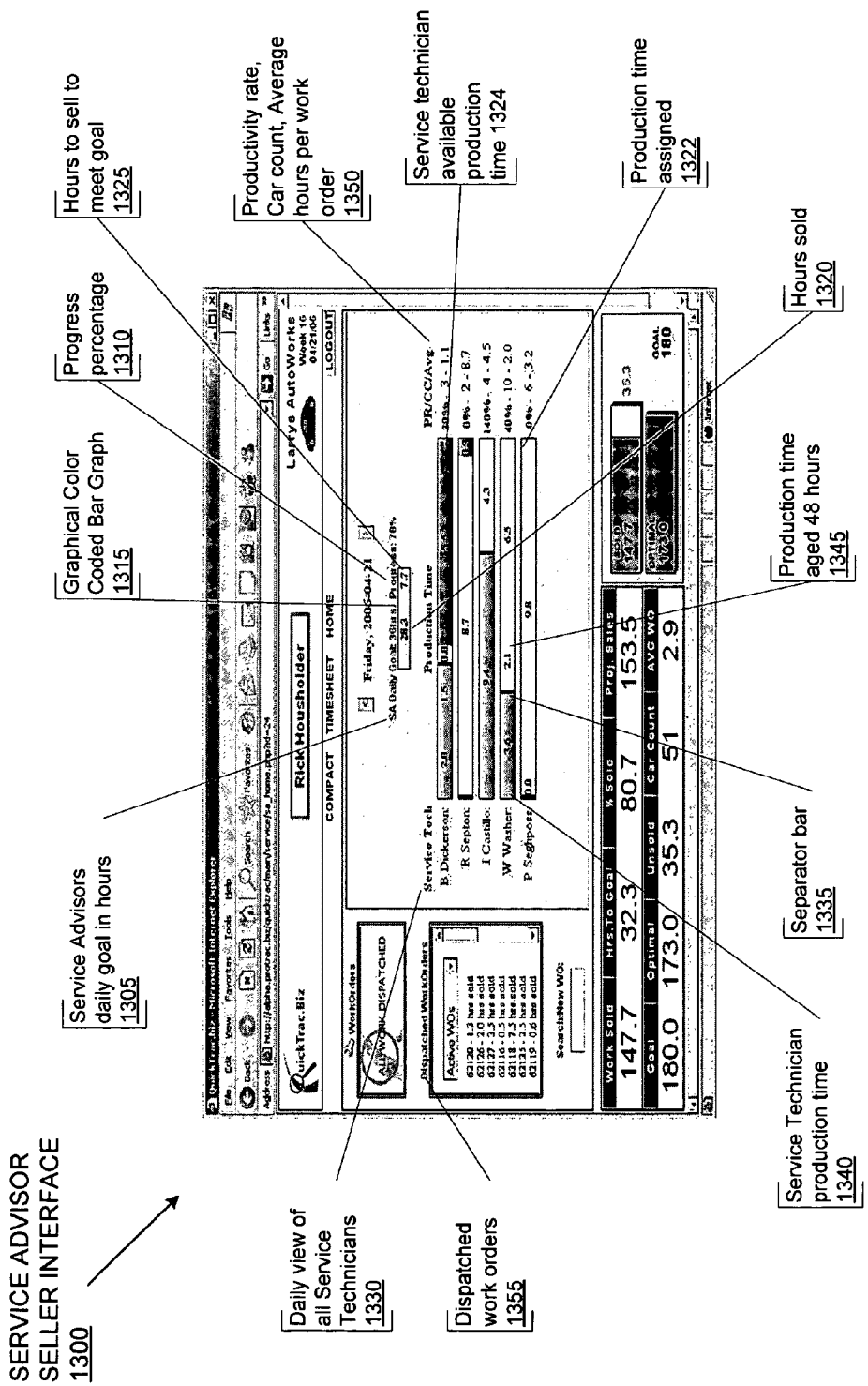
FIG. 13 SERVICE ADVISOR SELLER INTERFACE

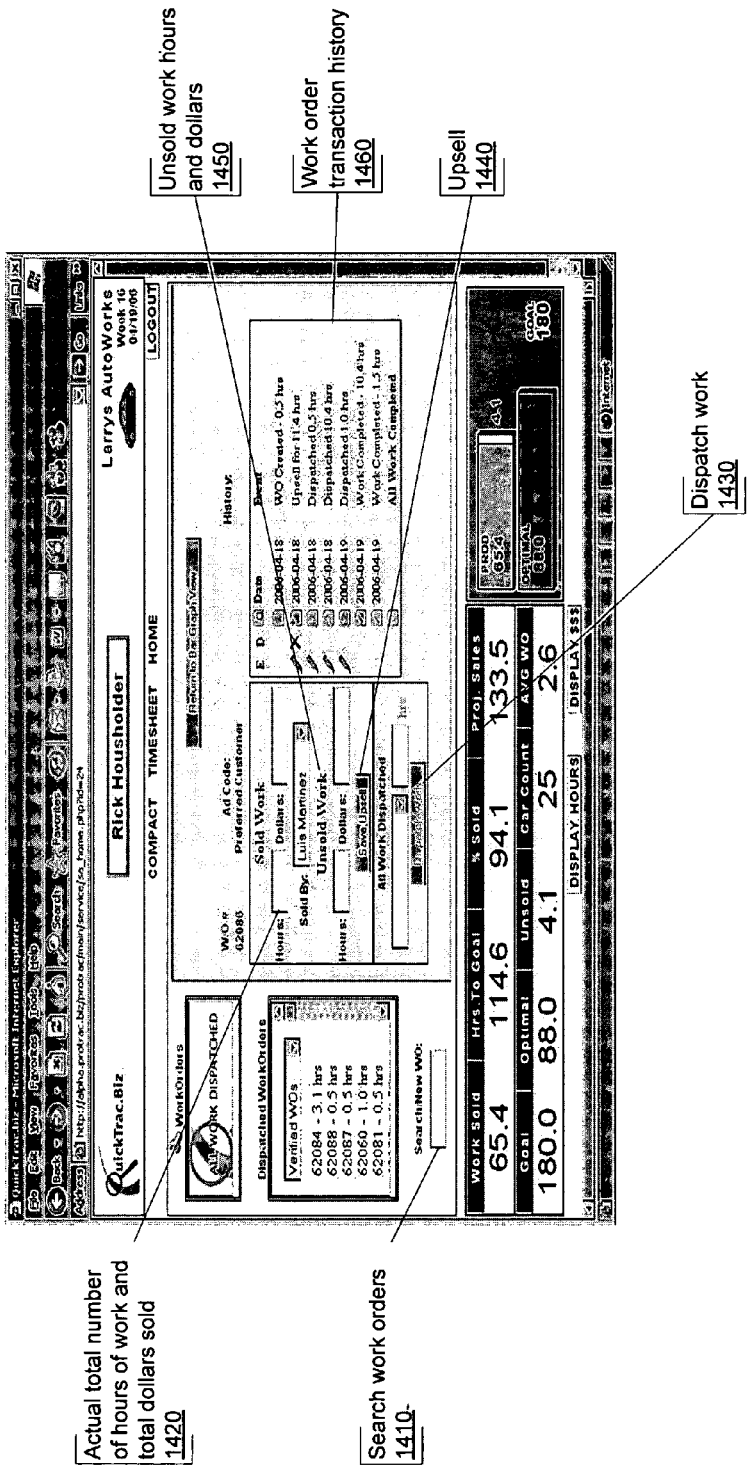
FIG. 14 SERVICE ADVISOR SELLER INTERFACE TO CREATE A WORK ORDER

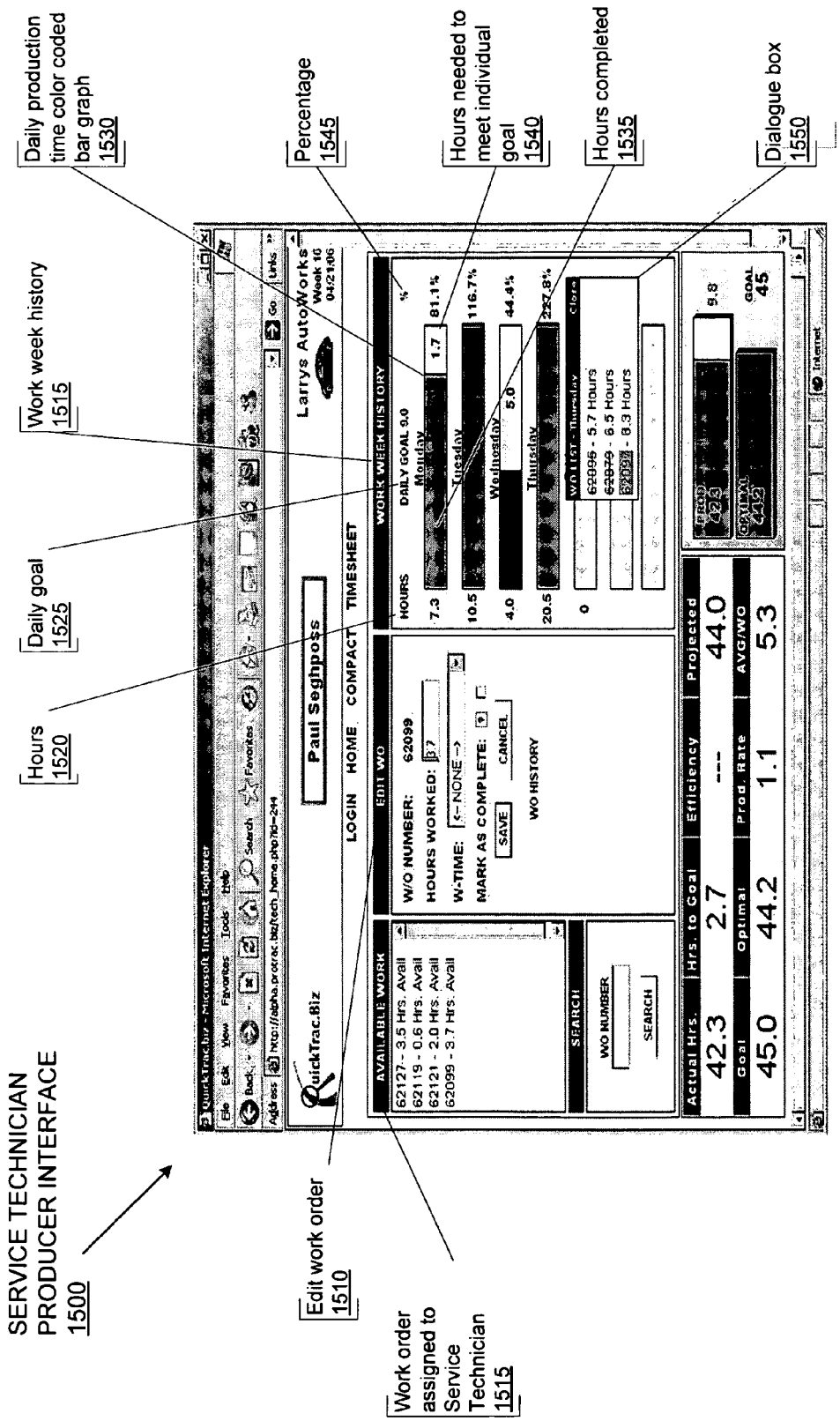
FIG. 15 SERVICE TECHNICIAN PRODUCER INTERFACE

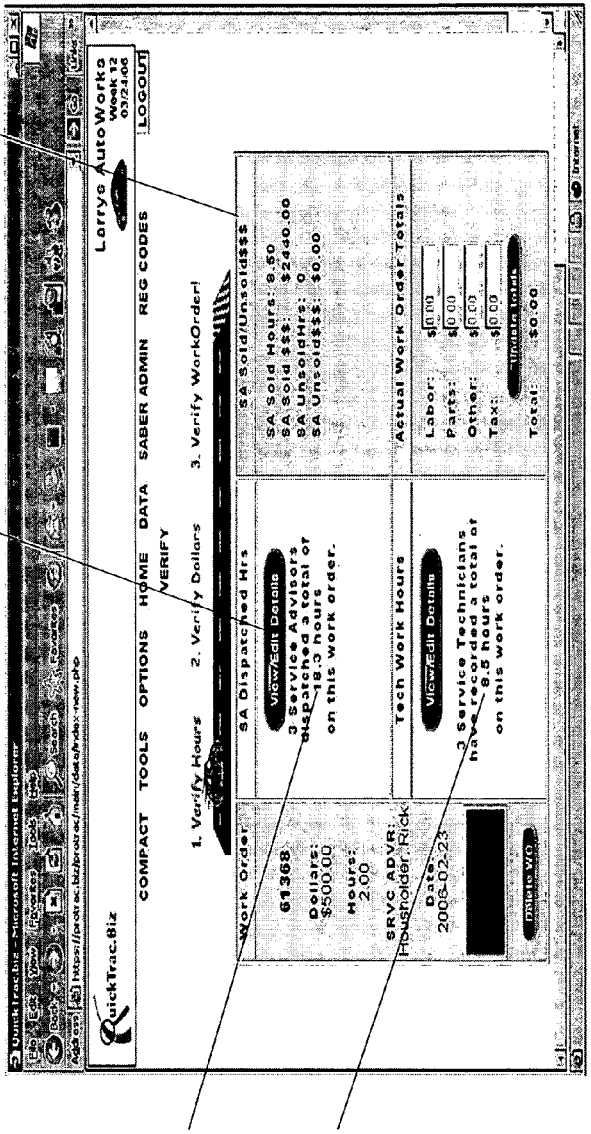
FIG. 16 ADMINISTRATOR VERIFICATION INTERFACE

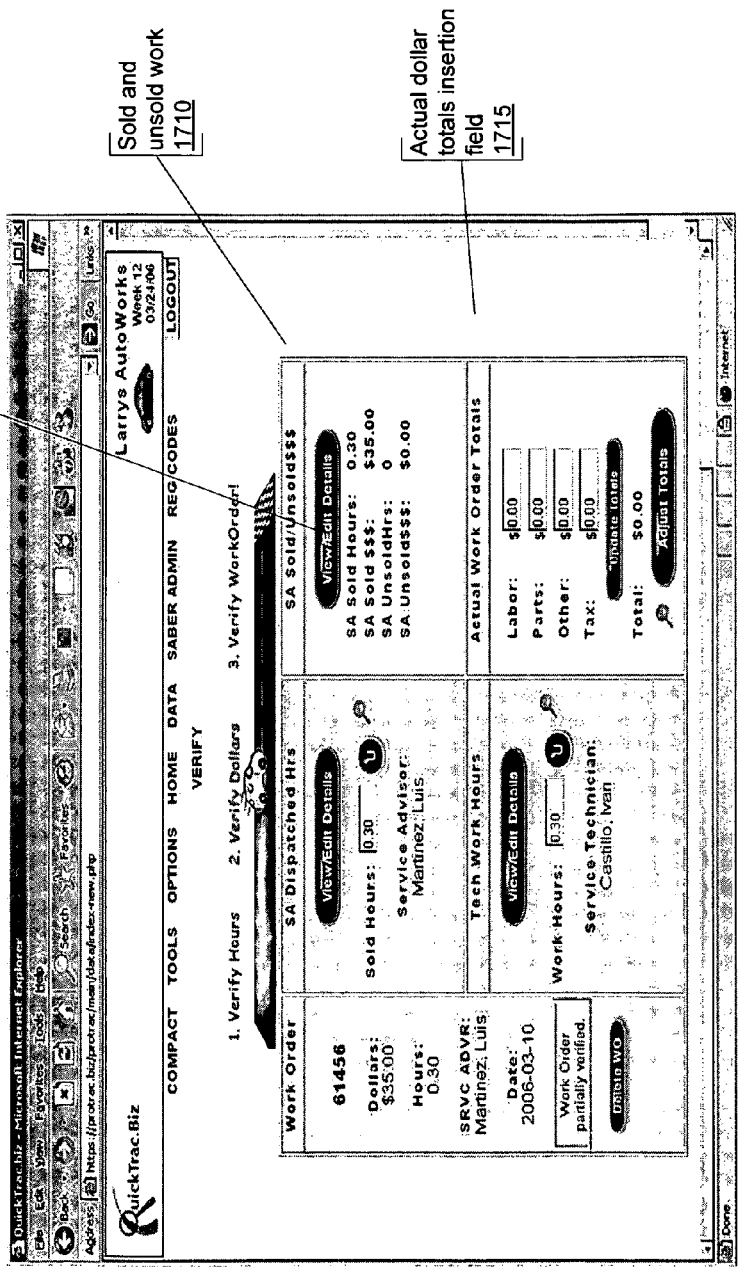
FIG. 17 ADMINISTRATOR VERIFICATION INTERFACE

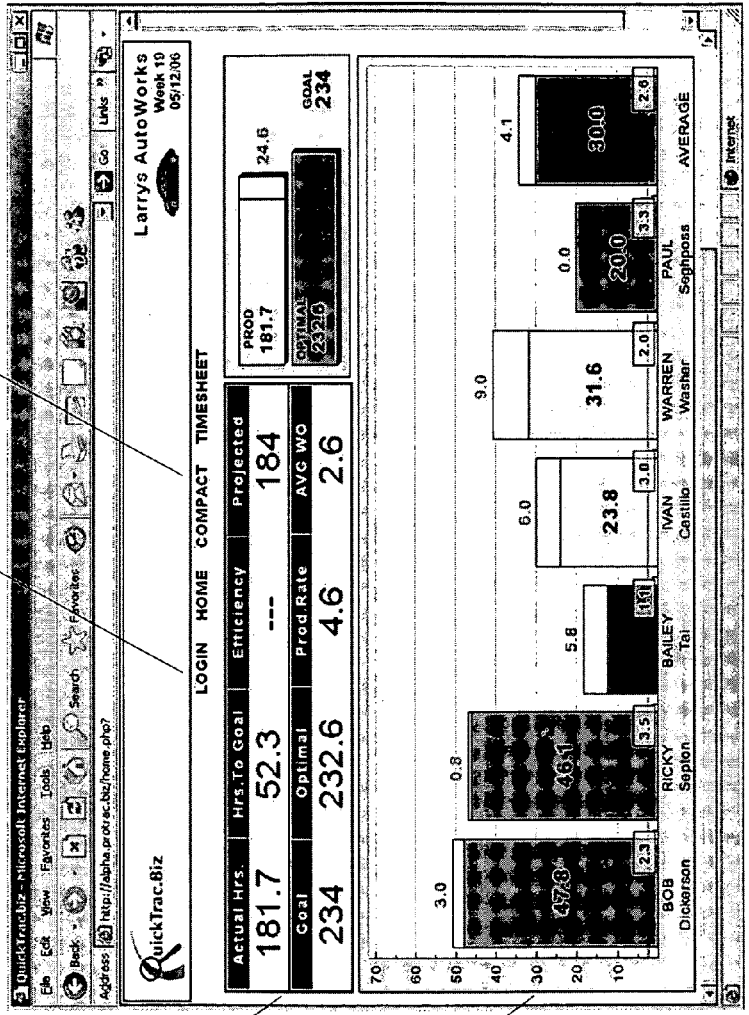
FIG. 18 MAIN SHOP DISPLAY AND SERVICE TECHNICIAN DISPLAY

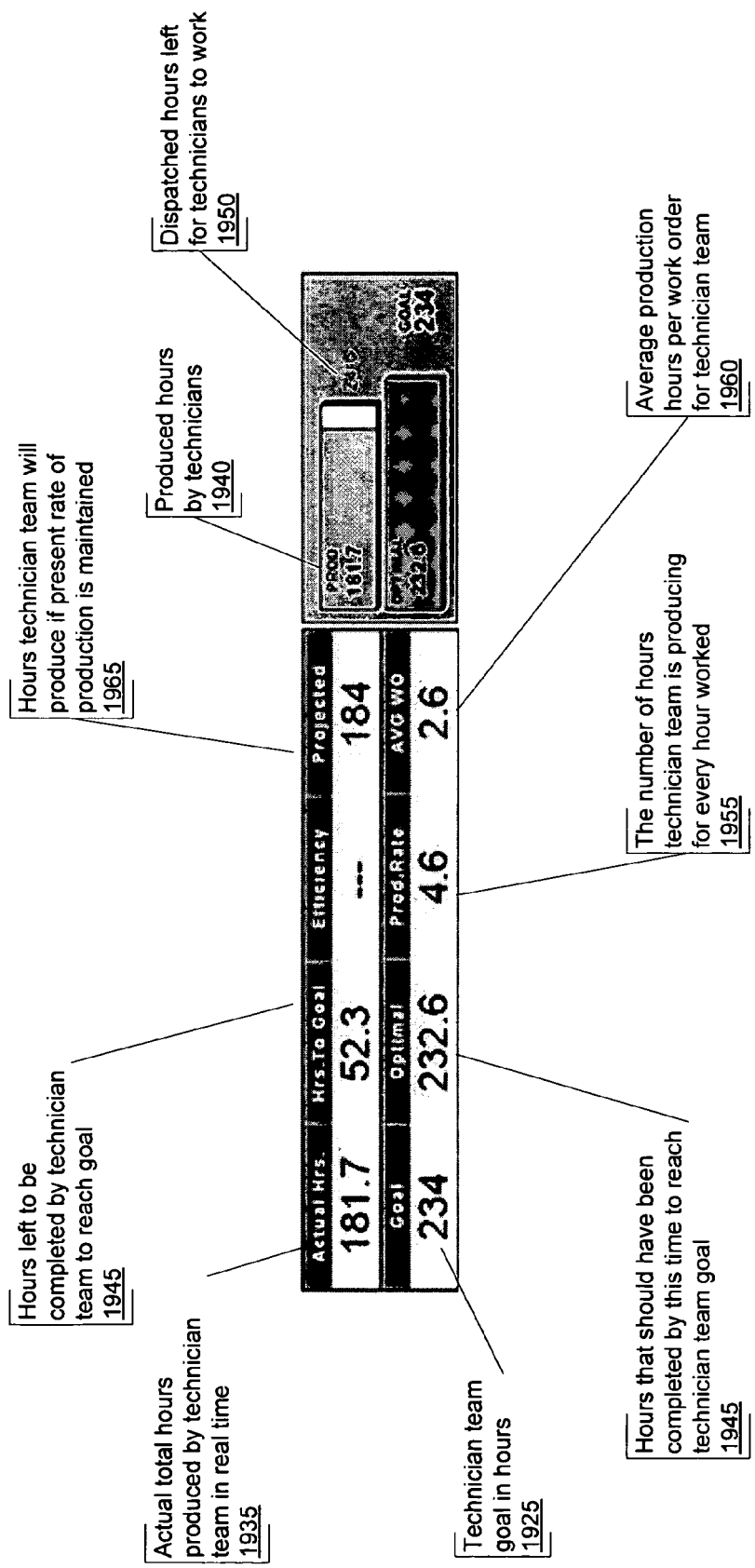
FIG. 19 SERVICE TECHNICIAN TEAM PERFORMANCE DISPLAY

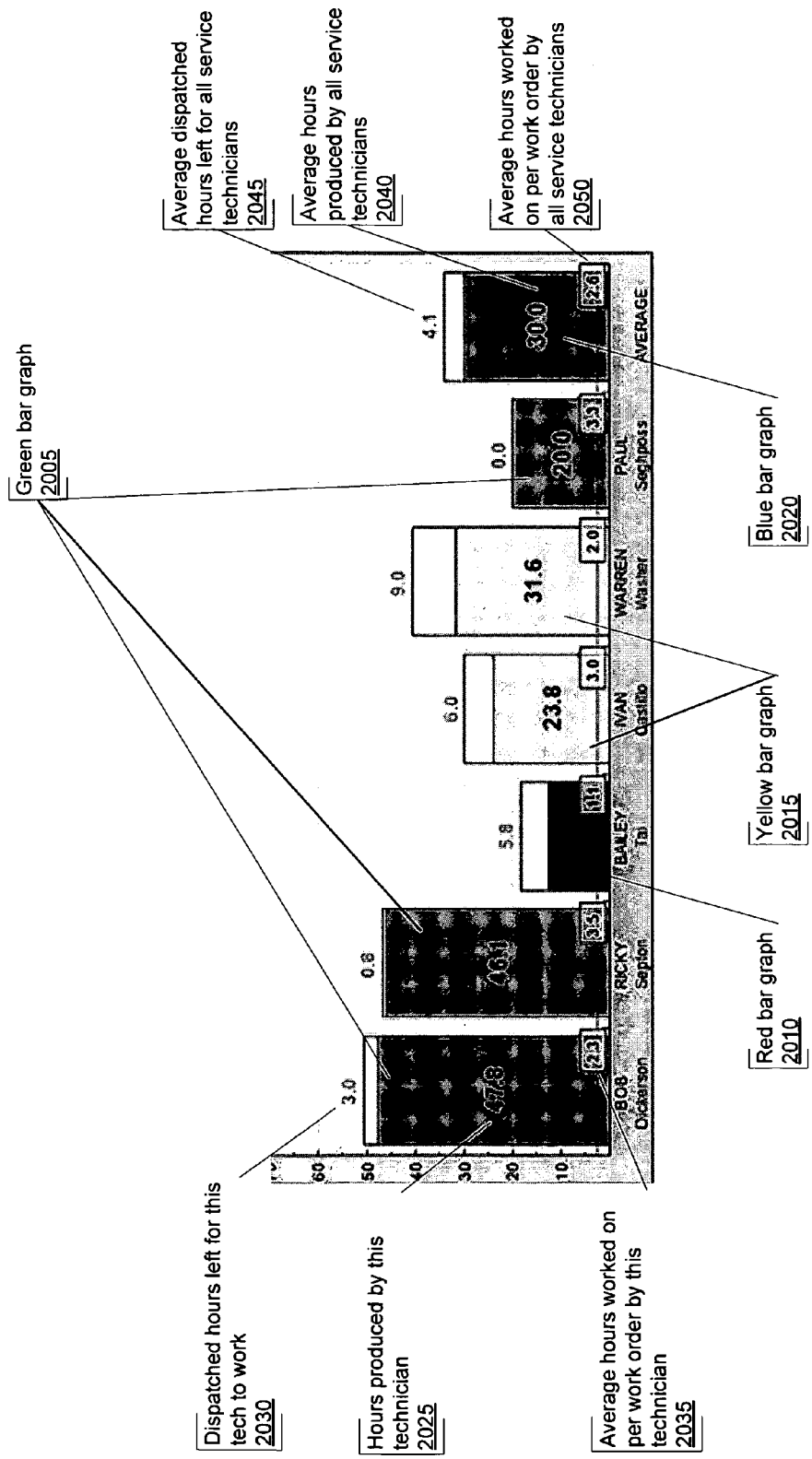
FIG. 20 INDIVIDUAL SERVICE TECHNICIAN PERFORMANCE DISPLAY

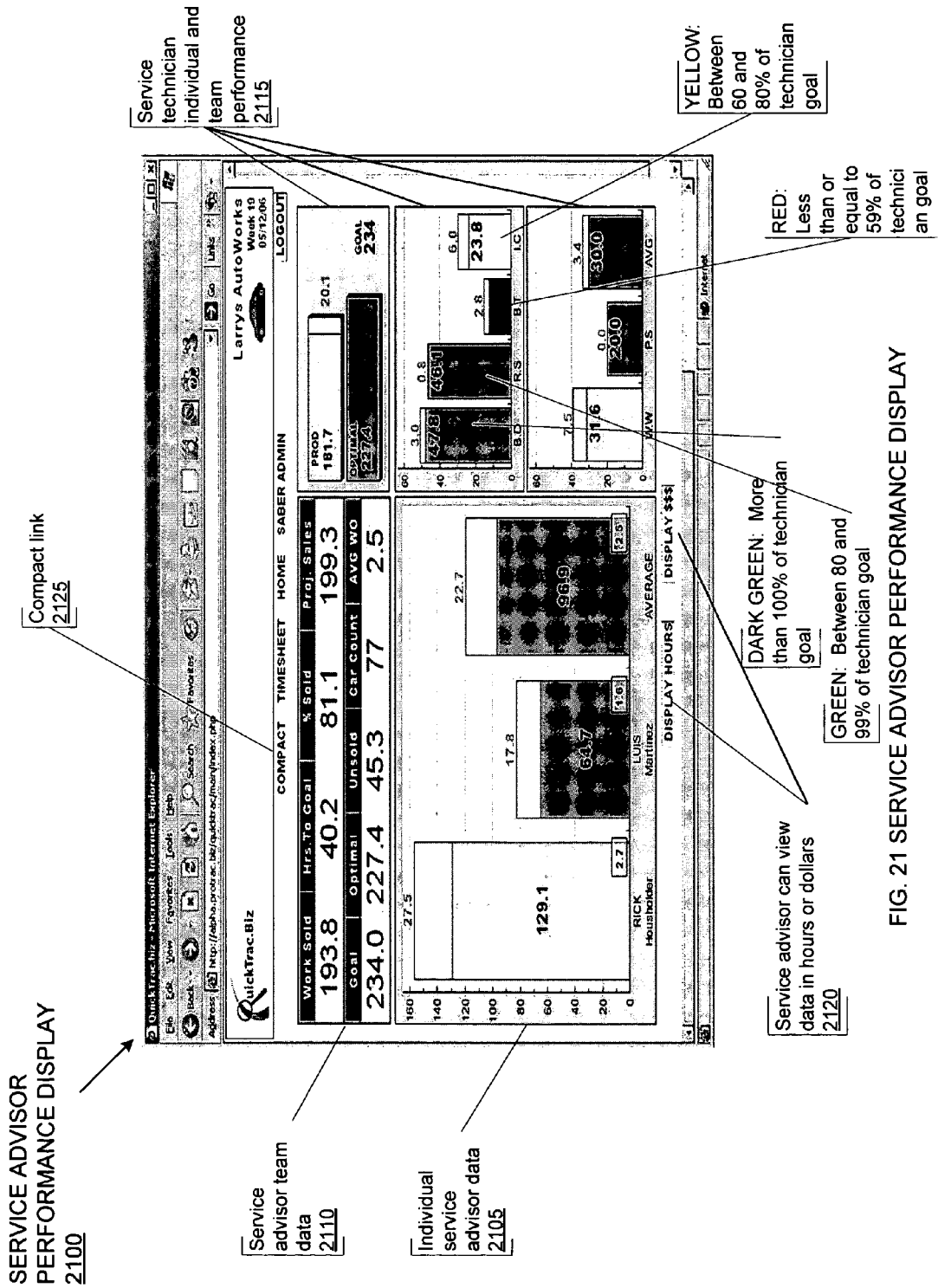
FIG. 21 SERVICE ADVISOR PERFORMANCE DISPLAY

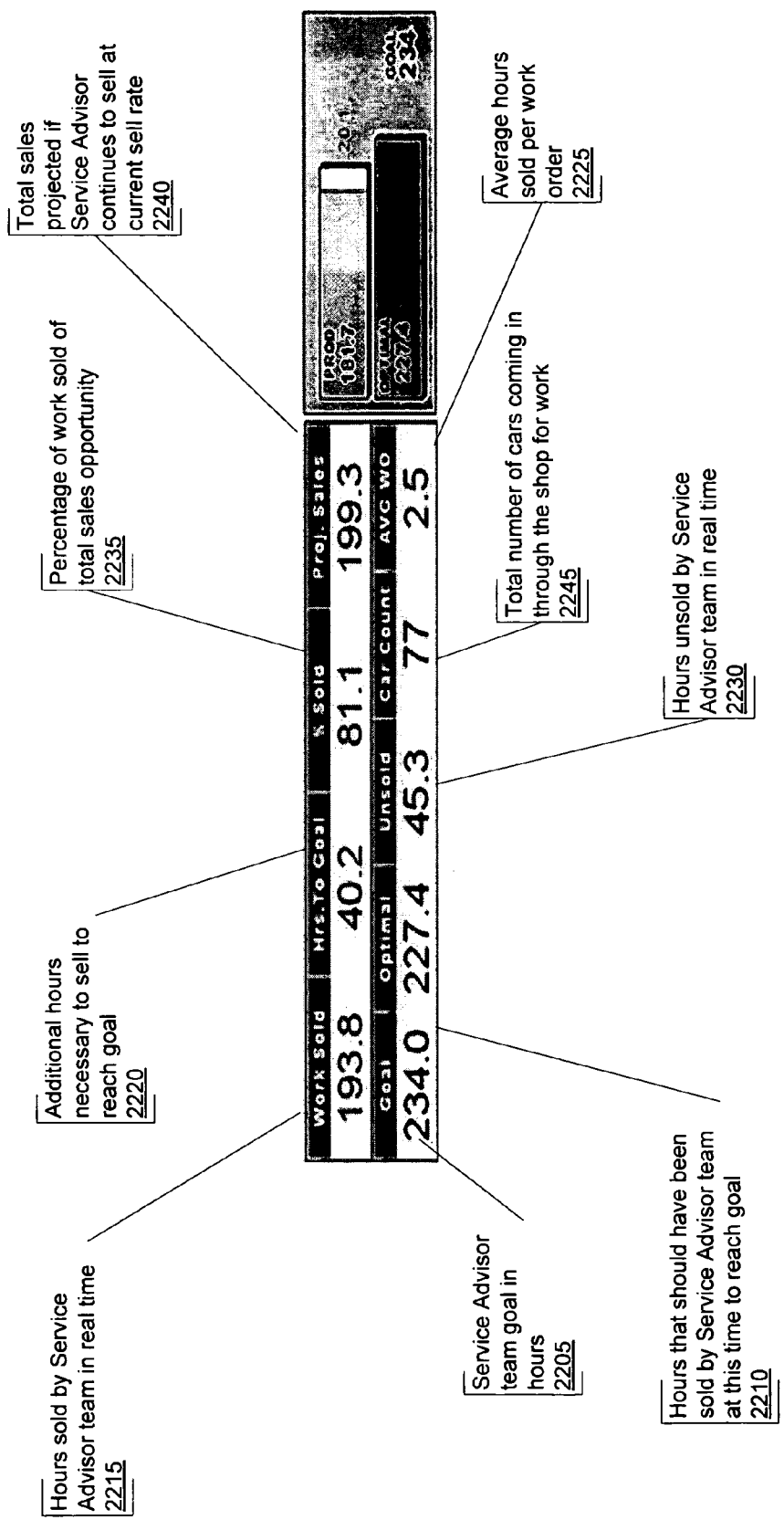
FIG. 22 SERVICE ADVISOR TEAM PERFORMANCE DISPLAY

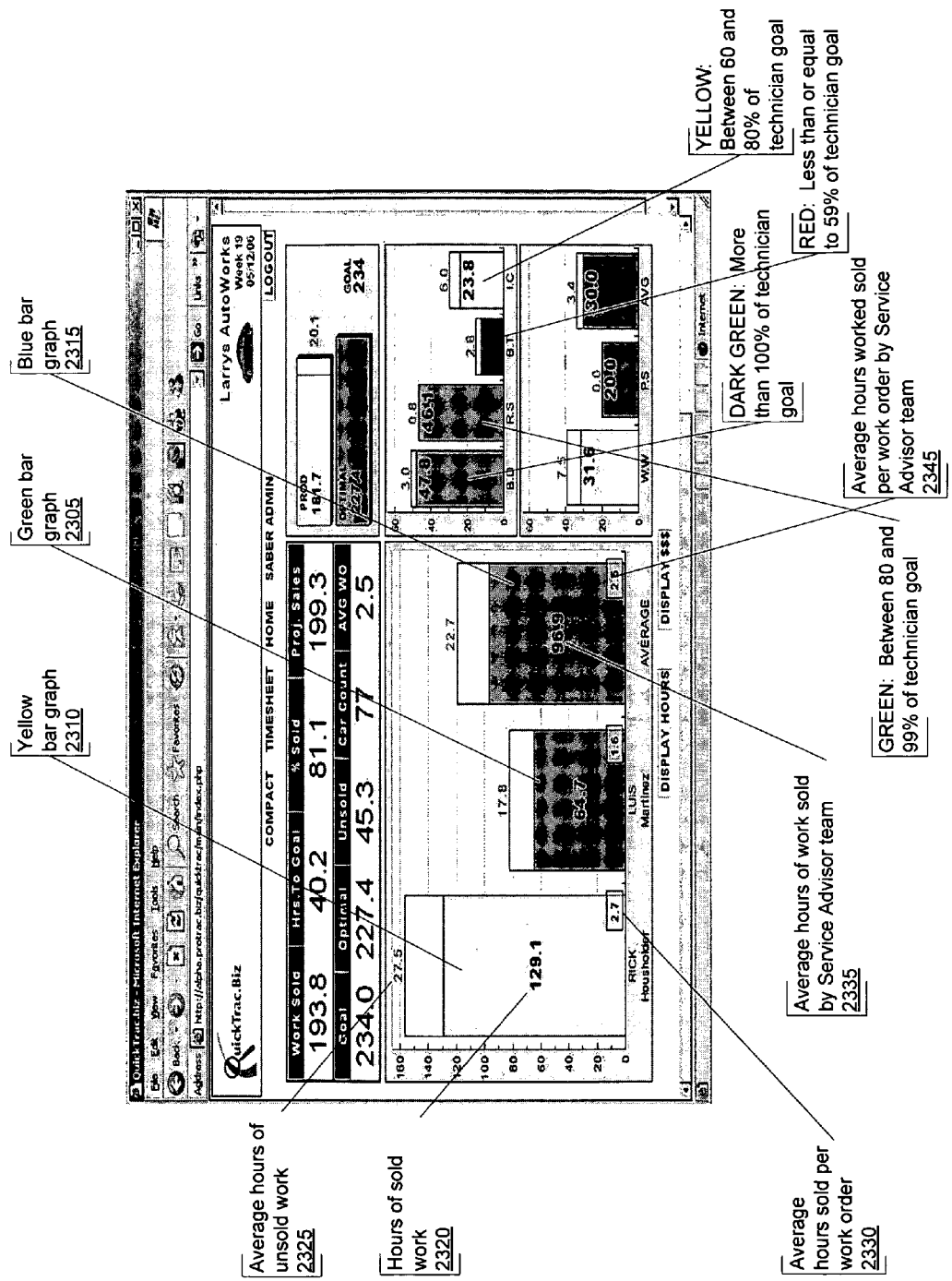
FIG. 23 INDIVIDUAL SERVICE ADVISOR PERFORMANCE DISPLAY

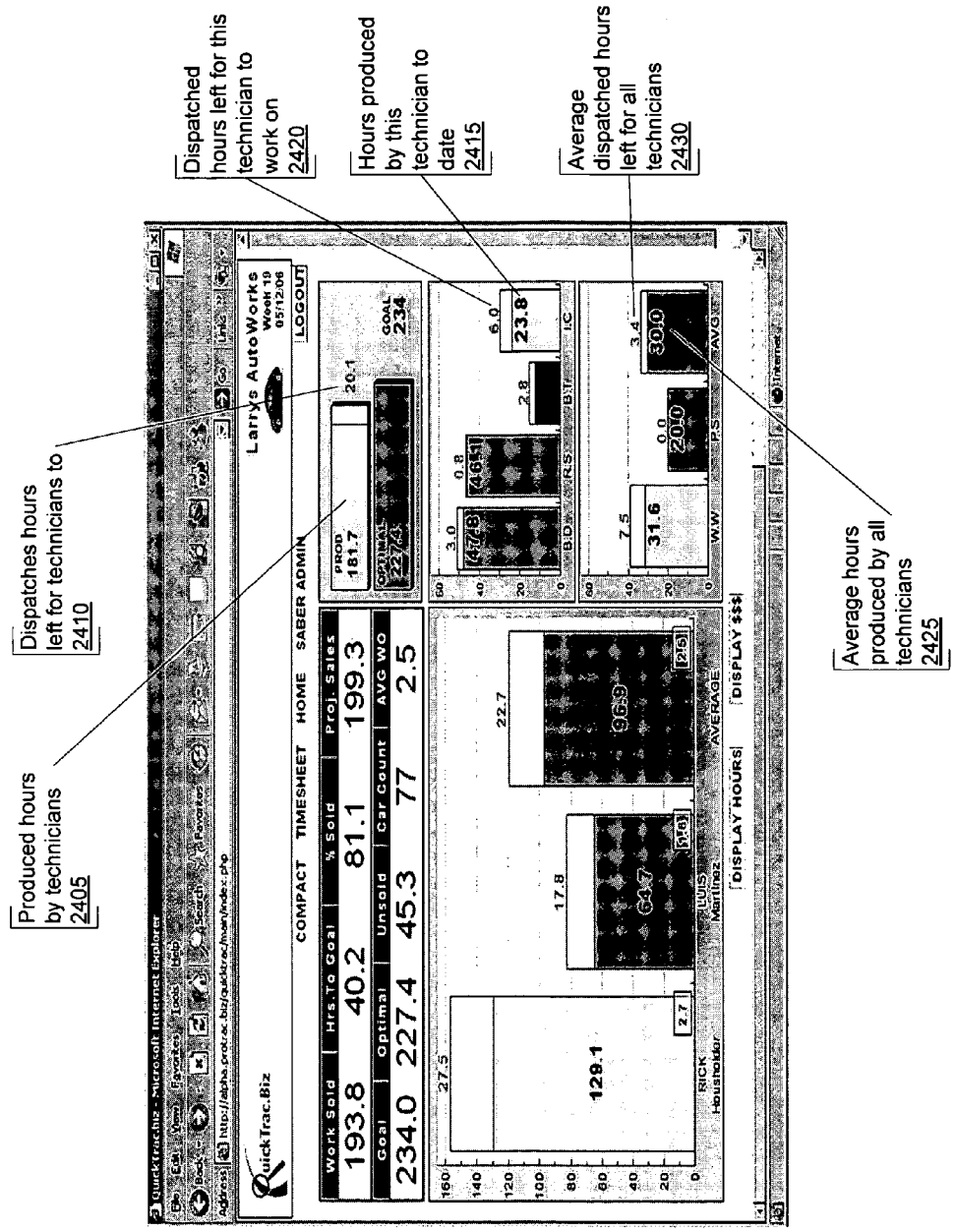
FIG. 24 SERVICE ADVISOR DISPLAY OF SERVICE TECHNICIAN PERFORMANCE

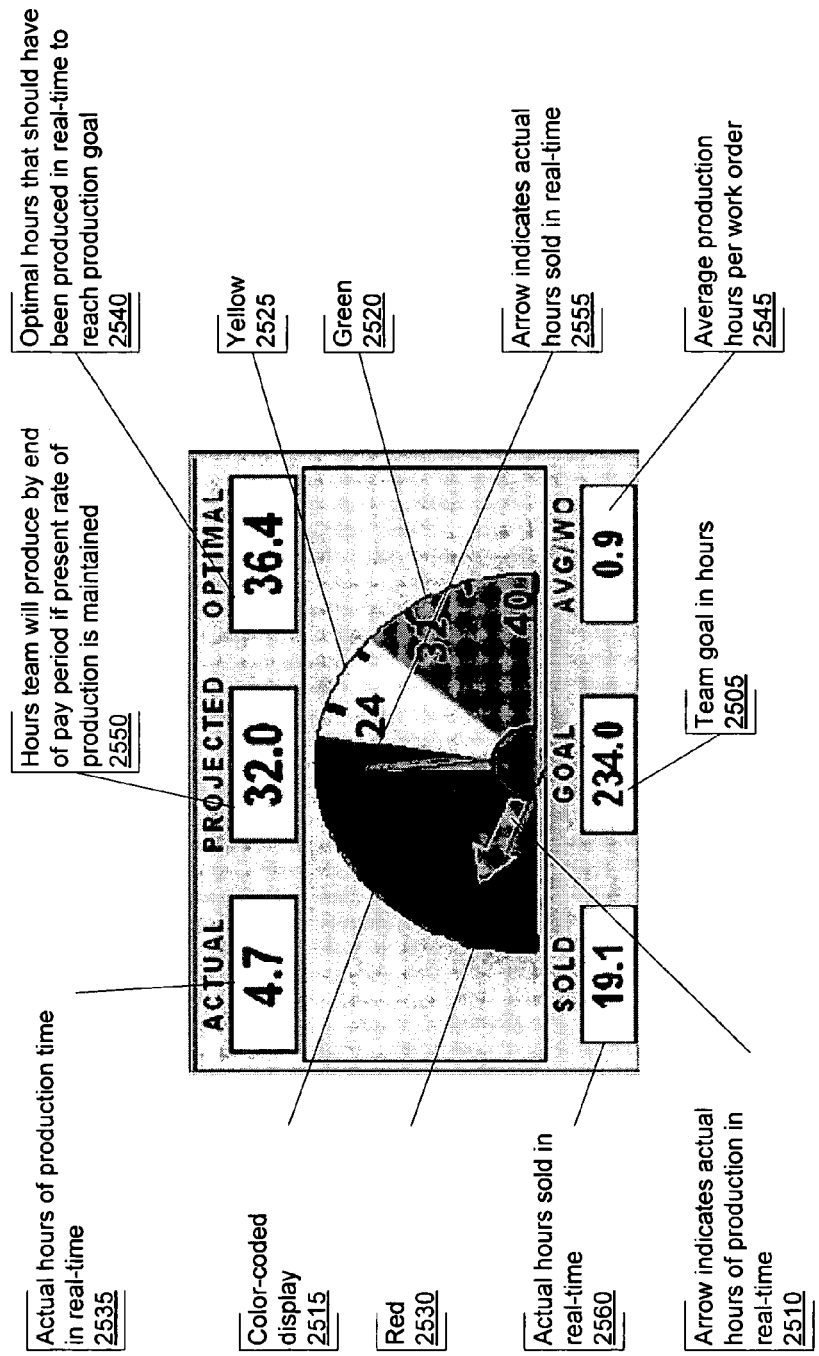
FIG. 25 COMPACT VIEW OF OVERALL BUSINESS STATE

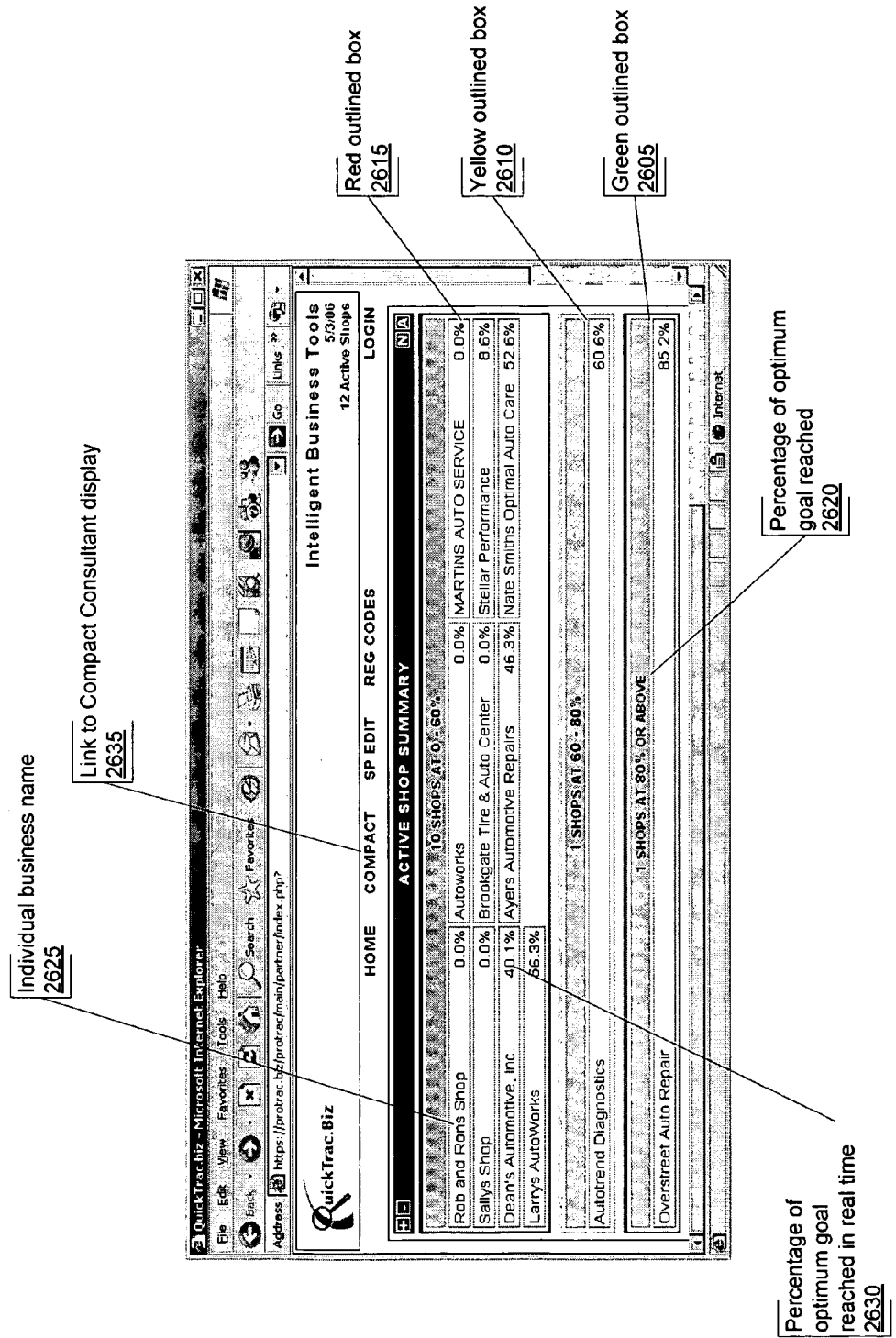
FIG. 26 MAIN Business Monitor INTERFACE

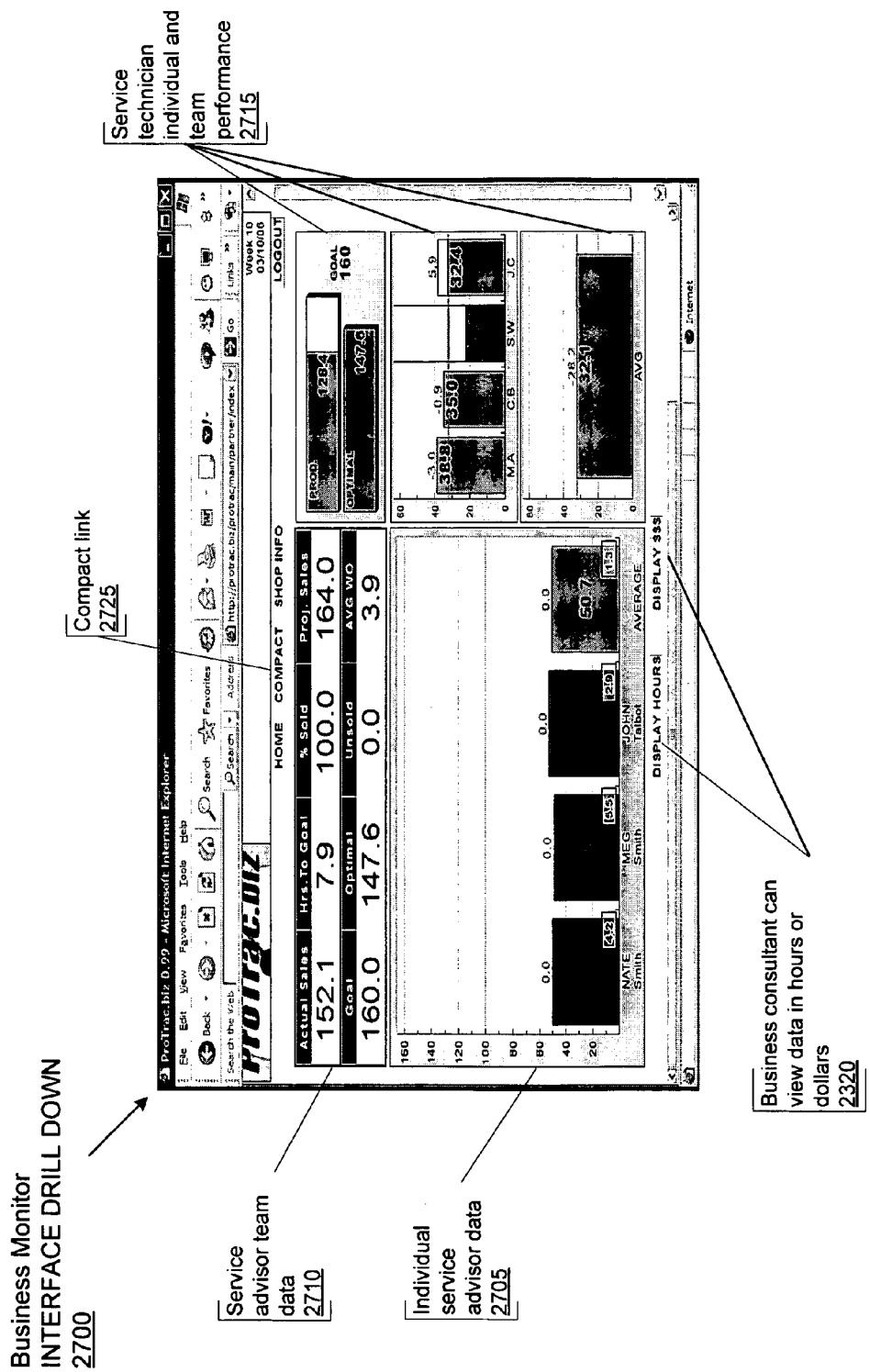
FIG. 27 Business Monitor INTERFACE DRILL DOWN

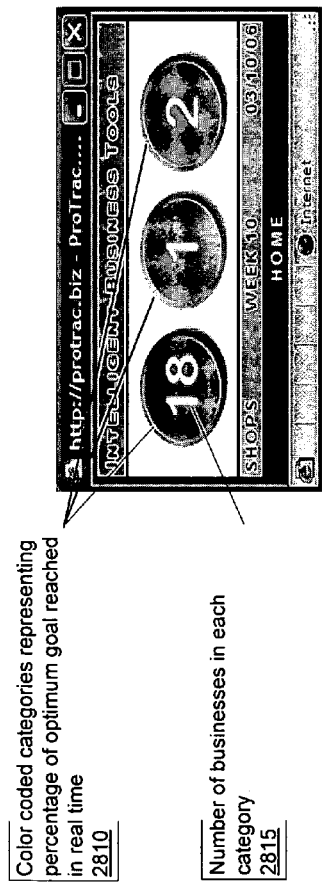
FIG. 28 SUMMARY DISPLAY
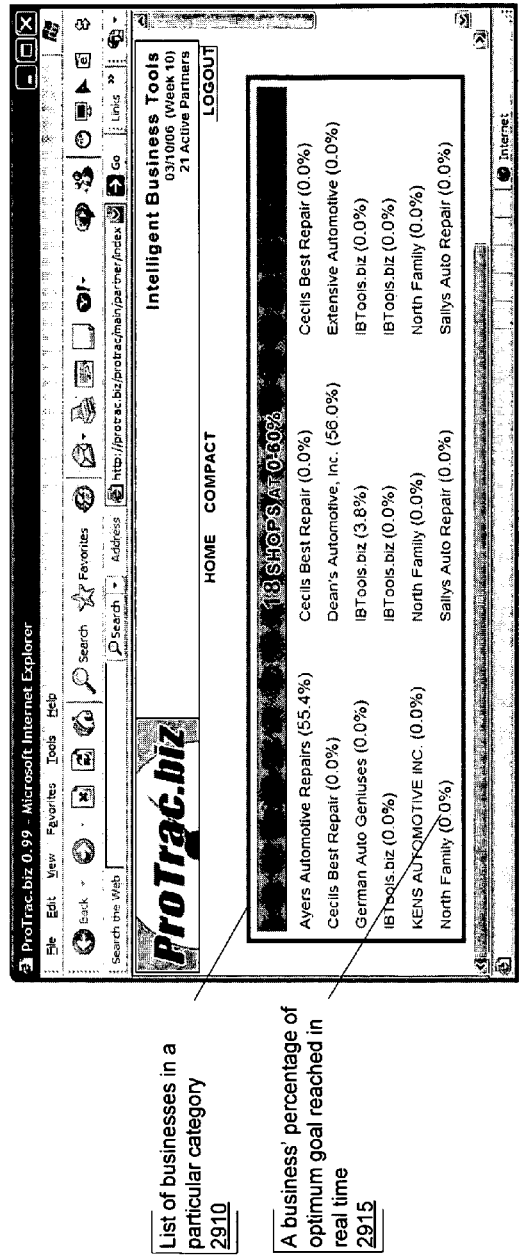
FIG. 29 LIST OF SHOPS FROM COMPACT Business Monitor DISPLAY

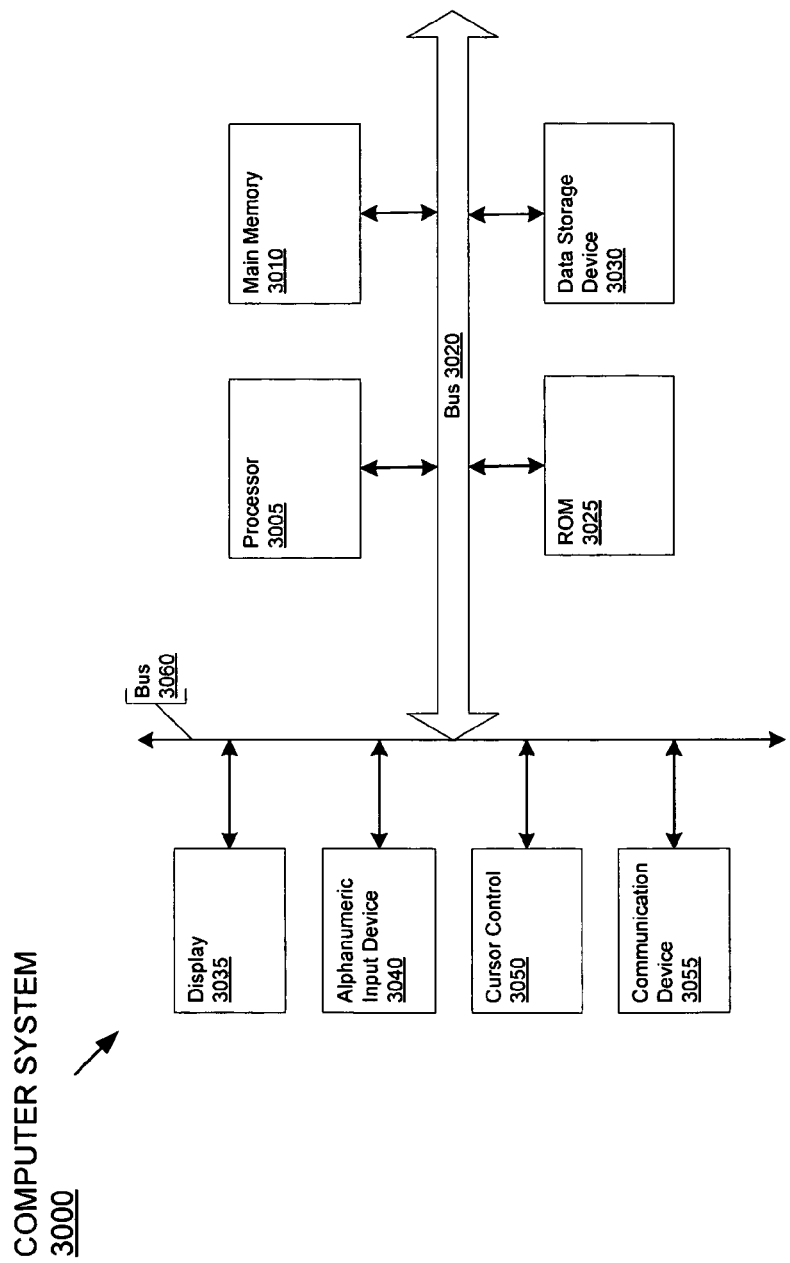
FIG. 30 BLOCK DIAGRAM OF COMPUTER

METHOD AND APPARATUS FOR PROVIDING A BUSINESS TOOL

FIELD OF THE INVENTION

The present invention relates to the field of business consulting, and more specifically, a system for the retrieval, analysis, and display of pseudo-real-time business data for the business consultant and/or business owner.

BACKGROUND

Generally small businesses that provide a service do not have an easy and effective way to measure the performance of their business and employees in order to become a more effective business. Business owners and managers lack the means to track key information that is important to their success. Furthermore, businesses may have the impression that they are operating at optimal conditions and producing maximum net profit, but they do not have the data to affirm their success or recognize additional areas of opportunity.

For example, in the automotive service and repair industry, business owners typically wait until they receive a financial statement at the end of the month or end of quarter to determine whether or not they have improved their bottom line or met their financial objectives. Thus, business owners cannot make key staffing, training, and advertising decisions until after a problem has affected their business sales and productivity for quite some time. They cannot be proactive in their business analysis and approach. Moreover, they do not have an easy way to measure return on advertising dollars and trace where their best customers come from quantifying their advertising dollars.

In addition, business owners do not have the data to clearly detect problems and identify the appropriate source. Without the data, business owners do not know what type of corrective steps to take, which is most important or which order to make them. For example, business owners cannot identify whether changes to sales or technician training will solve the problem or whether increasing headcount or advertising is the better solution. More importantly, without this pseudo-realtime data, businesses do not know if the changes they have implemented have had a positive or negative effect until it is too late.

SUMMARY OF THE INVENTION

A method and apparatus for business consulting are described. An input interface enables designated personnel to enter data in pseudo-real-time into the system. Analysis logic calculates key values for a business based on the pseudo-real-time data entered and enables the display of the relationship of the key values to projected goals. A user interface provides a visual display of an immediate identification of an overall business state.

BRIEF DESCRIPTION OF THE DRAWINGS

The present invention is illustrated by way of example, and not by way of limitation, in the figures of the accompanying drawings and in which like reference numerals refer to similar elements and in which:

FIG. 11 is a flowchart of one embodiment of enabling a business monitor to use the projection tool.

FIG. 12 is a diagram illustrating one embodiment of the relationships between the various interfaces and displays FIG. 13 is a screen shot of one embodiment of an individual service advisor seller interface.

FIG. 14 is a screen shot of one embodiment of an individual service advisor seller interface for creating a work order.

FIG. 15 is a screen shot of one embodiment of an individual service technician producer interface.

FIGS. 16-17 are screen shots of one embodiment of an administrator verification interface.

FIG. 18 is a screen shot of one embodiment of the main business display for service technicians.

FIG. 19 is a screen shot of one embodiment of the service technician team performance display.

FIG. 20 is a screen shot of one embodiment of all service technician performance display.

FIG. 21 is a screen shot of one embodiment of the service advisor team performance display.

FIG. 22 is a screen shot of one embodiment of the service advisor team data display.

FIG. 23 is a screen shot of one embodiment of service advisor team performance display.

FIG. 24 is a screen shot of one embodiment of a service advisor's display of the service technicians' performance.

FIG. 25 is a screen shot of one embodiment of a compact display of the overall business state.

FIG. 26 is a screen shot of one embodiment of the business monitor interface

FIG. 27 is a screen shot of one embodiment of the business monitor business interface drill down.

FIGS. 28-29 are screen shots of one embodiment of the compact business monitor display.

FIG. 30 is a block diagram of one embodiment of a computer system that may be used in conjunction with the present invention.

DETAILED DESCRIPTION

The method and apparatus described are for real-time business consulting and visual display of an overall business state. Clearly stated and measured employee and team goals along with immediate feedback motivates employees and increases teamwork and employee satisfaction which propels the business forward in appropriate key areas.

In the present specification, the invention is described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Figure 1:
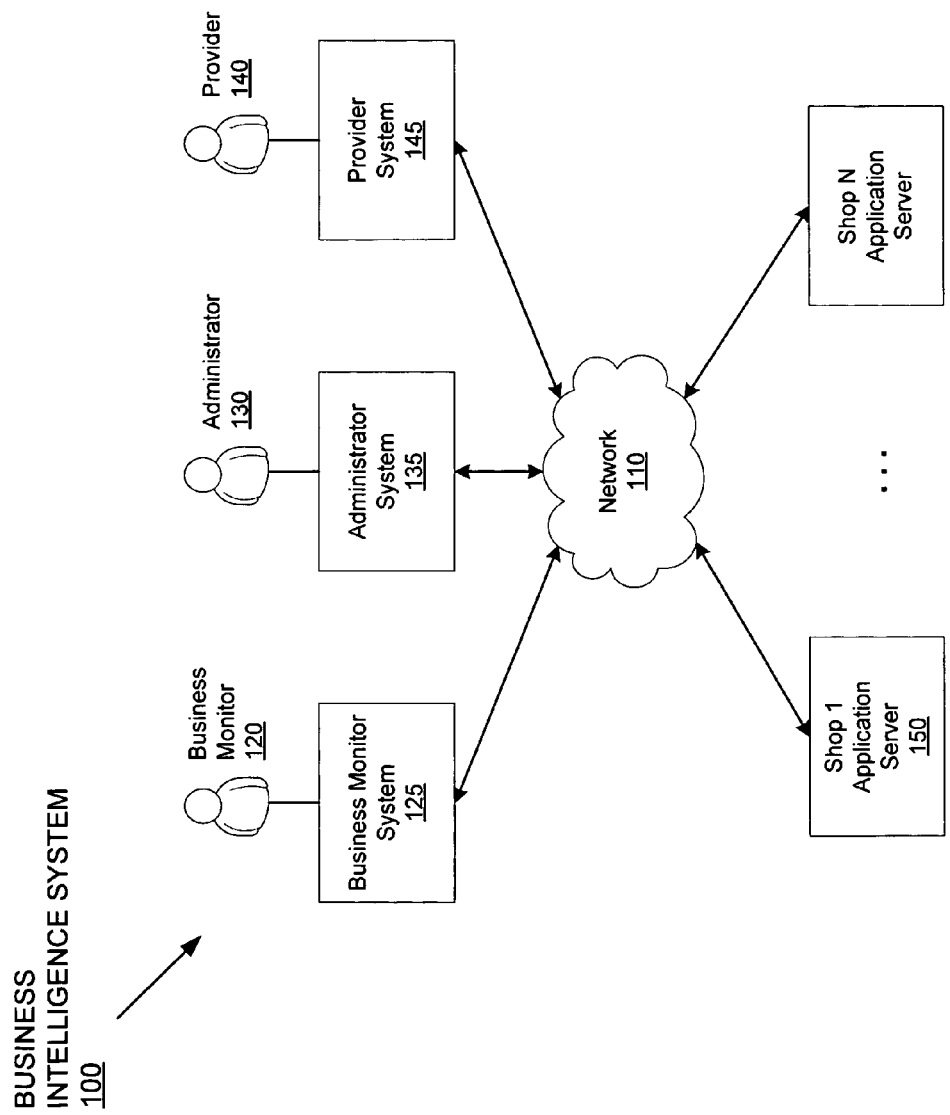
FIG. 1 is one embodiment of a network on which the present invention may be implemented.

FIG. 1 is one embodiment of a network on which the present invention may be implemented. For one embodiment, the business intelligence system 100 includes one or more business application servers 150, several client systems, and several different users. Users can be designated personnel, for example, a business monitor 120, an administrator 130, and a provider 140. A business monitor 120, in one embodiment, is anyone viewing data over more than a single shop. For example, the business monitor 120 may be an administrator handling multiple locations, a regional manager, district supervisor, coach, and/or a multi-shop owner. A business monitor 120 has the capability of seeing and comparing the performance of multiple businesses simultaneously. An administrator 130 is anyone who needs to obtain complete information about a single shop. The administrator may be a manager, owner, or other individual who sees an overview of a particular shop's performance. A provider 140 is anyone who actually sells, produces, or is otherwise involved with the It will be apparent to those of ordinary skill in the art that there can be one or more of each of these types of personnel. In one embodiment, the business monitor application 125, administrator application 135, and provider application 145 may be on the same computer system. In another embodiment, the business monitor application 125, administrator application 135, and provider application 145 may be on separate computer systems as illustrated in FIG. 1.

For one embodiment, the application is a web-hosted application. The network 110 may be the Internet. Alternatively, the network 110 may be a local area network (LAN), wide area network (WAN), or another type of network. For one embodiment a user can access the system from a thin client, such as a web browser. For one embodiment, the system can be accessed by a thick client.

In one embodiment, a user can monitor several businesses. In one embodiment, each business has a separate application server 150. However, in another embodiment there can be more than one business on a single application server 150.

FIGS. 2-5 illustrate different embodiments of a hierarchy of possible different users such as a business monitor 120, an administrator 130, a provider 140. In one embodiment, the business monitor 120 can use the system 100 to monitor the performance of a single or multiple businesses relative to the businesses' business goals. Note that the term "businesses" may apply to any business establishment, store, service provider, or other organization which includes sales personnel and/or production personnel.

Figure 2:
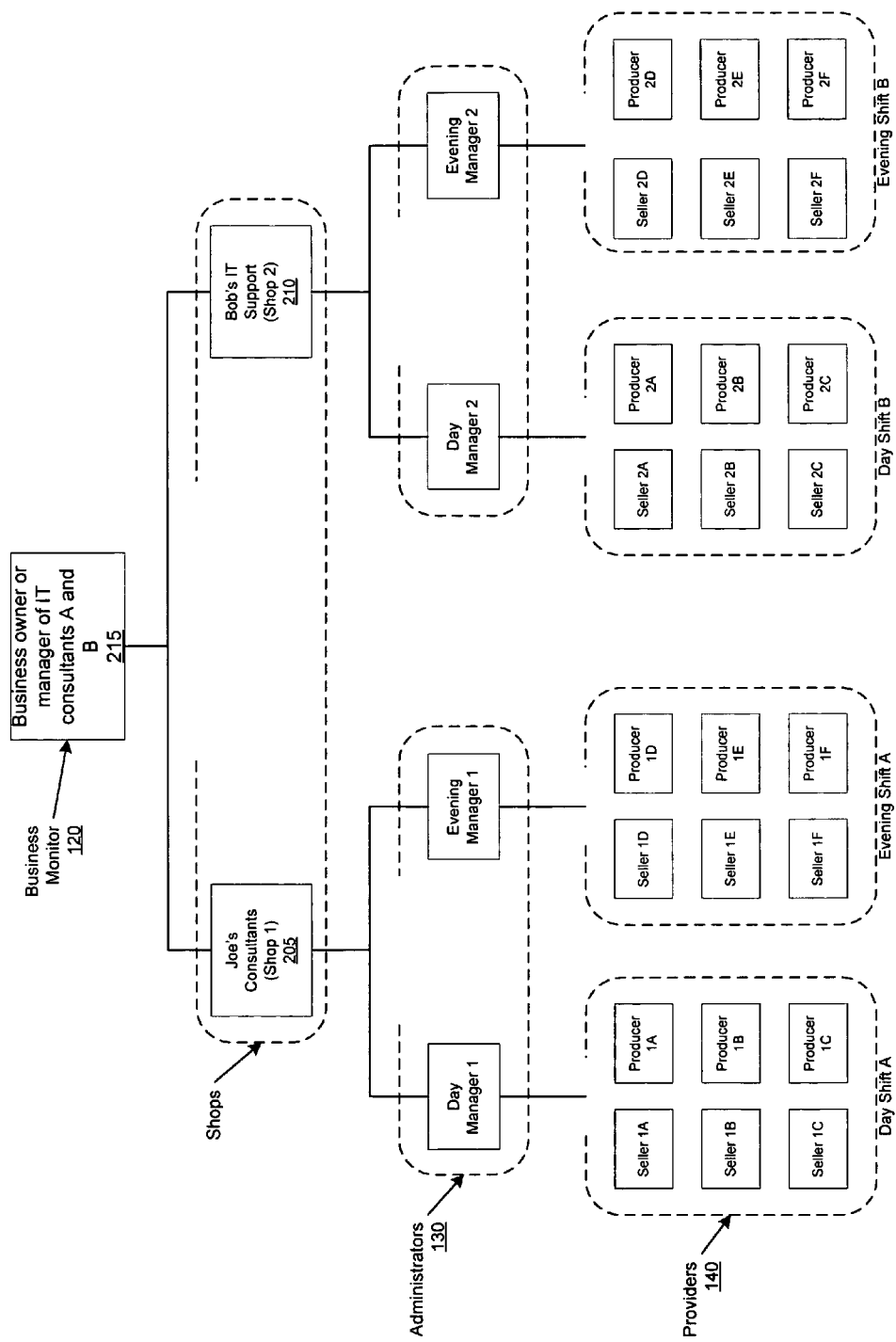
FIG. 2 is an illustration of one embodiment of the various users in the IT industry.

For example, in FIG. 2, a user uses the system 100 to monitor the performance of two information technology (IT) consultant businesses, Joe's Consultants (Business 1) 205 and Bob's IT Support (Business 2) 210. The system 100 collects and analyzes data and enables a business monitor 120 to recommend steps to take to optimize the performance of Joe's Consultants 205 and Bob's IT Support 210.

When a user is monitoring the performance of multiple businesses, the user is acting as a business monitor 120. A business monitor 120 can be the owner of a franchise, manager of a chain, third party business expert, or anyone who has the need to view performance of multiple businesses with ease.

Figure 3:
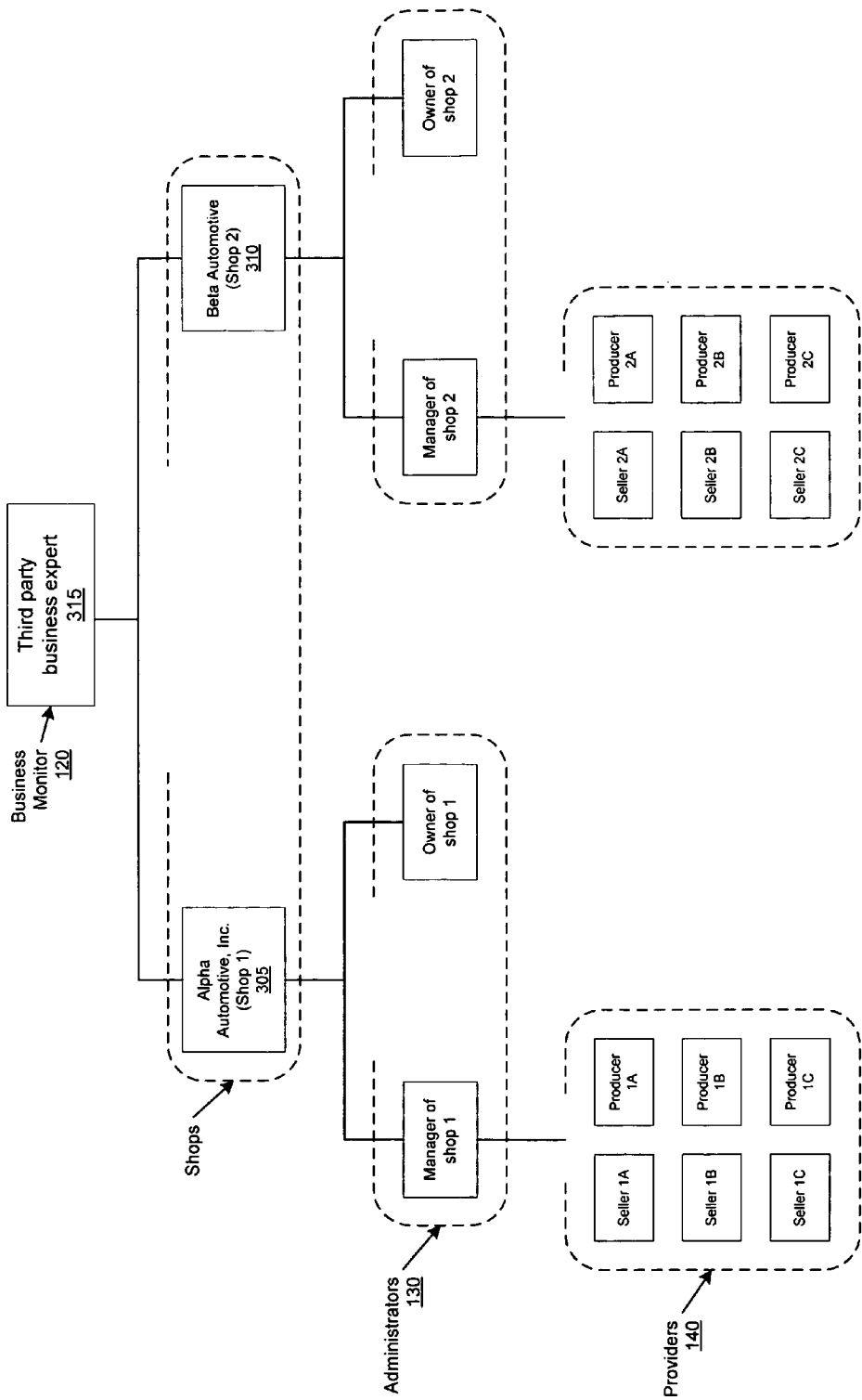
FIG. 3 is an illustration of one embodiment of the various users in the automotive industry.
Figure 4:
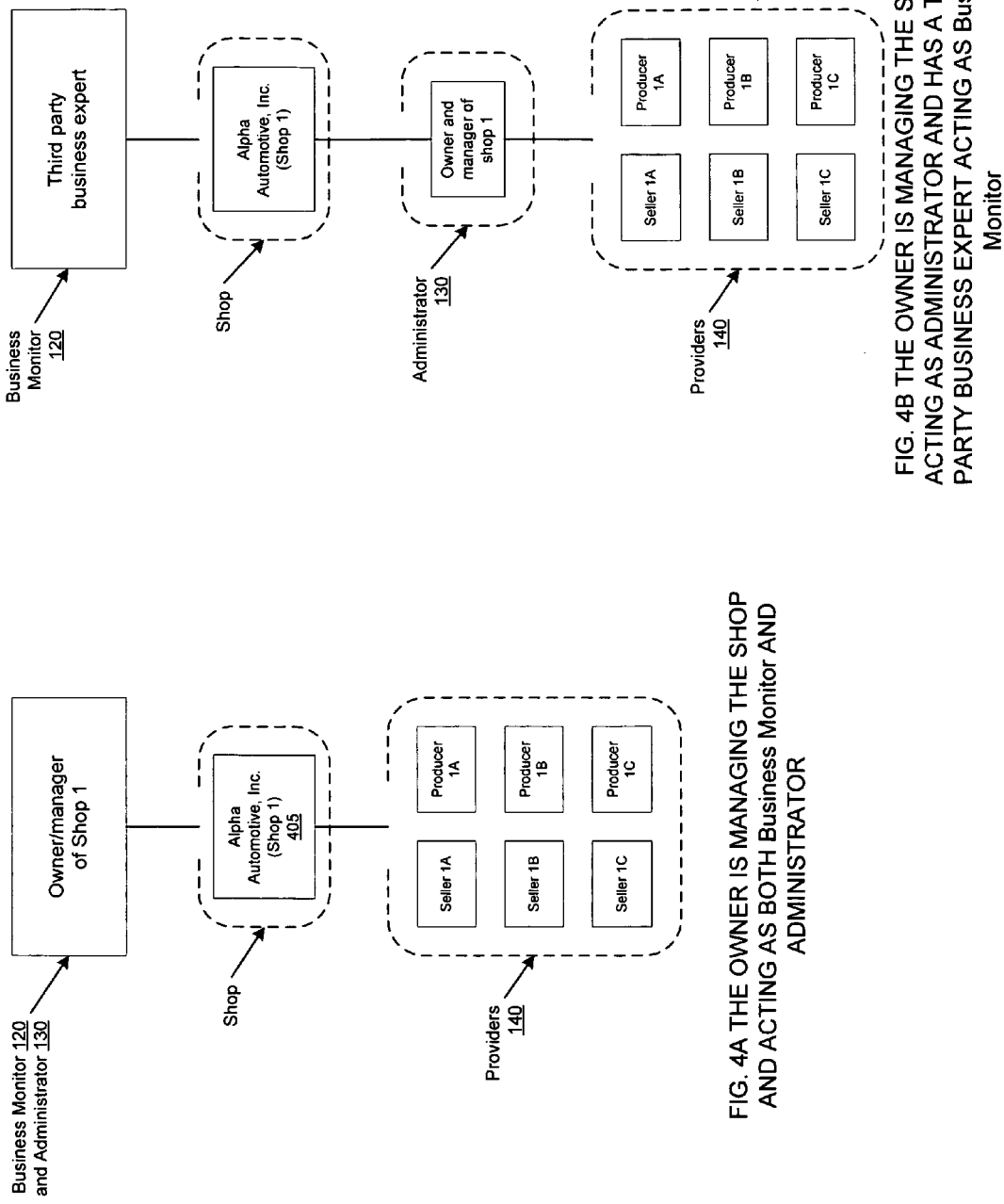
FIG. 4A is an illustration of one embodiment of the business intelligence system where the owner of a business is also the manager of a business.
FIG. 4B is an illustration of one embodiment of the business intelligence system that includes a third party business expert.

FIG. 3 illustrates one embodiment where the business monitor 120 is a third party business expert 315 monitoring two separately owned automotive service and repair businesses, Alpha Automotive 305 and Beta Automotive 310. It will be apparent to those of ordinary skill in the art, however that the business intelligence system 100 may be practiced in other industries. It will also be apparent to those of ordinary skill in the art that the business monitor 120 can monitor the performance of a single business, or multiple businesses in different areas. For example, FIG. 4A illustrates a user using the system 100 to monitor the performance of a single automotive service and repair business 405.

In one embodiment, the administrator 130 can be a manager of a business. In another embodiment, administrators 130 can include the manager and the owner of a business. For example, in FIG. 3, Alpha Automotive, Inc. has two administrators 130, the owner of the business and the manager of the business.

In one embodiment, the business monitor 120 and the administrator 130 can be the same individual. For example, FIG. 4A illustrates the business monitor 120 and the administrator 130 is the same person, the owner and manager of a business.

FIG. 4B illustrates another embodiment where the administrator 130 is an individual that both owns and manages a business, and the business monitor 120 is a third party business expert. It will be apparent to one of ordinary skill in the art that there can be one or more users acting in a single or multiple roles.

In one embodiment, a provider 140 is one of the personnel of a business, as illustrated in FIGS. 2-5. For example, a business may have two types of personnel, sellers and producers. Sellers are employees that sell goods and/or services to a customer. Producers are employees that make the goods and/or provide the services to a customer.

In the automotive repair industry a service advisor is a seller because the service advisor sells the automotive work to a customer. A service technician is a producer because the service technician performs the automotive work on a customer's vehicle. In the information technology (IT) industry, a technical support people or service desk personnel are sellers because they interact with the customer and make an estimate of what work will need to be done, and the field support engineer, or engineers, that actually provides the support to the customer is a producer. In IT situations, a customer may interact with multiple sellers and/or multiple producers, depending on the problem being presented. For example, a service desk person may determine that a problem is difficult to define, and pass the customer to a technical support person. That person may identify one or more field support engineers to provide the services required by the customer. As in the IT industry, sometimes multiple producers and/or sellers may be associated with a single transaction. In some instances, a seller may be able to solve the problem without involving a producer. For example, in the computer support business, a customer may come in with an issue that is not actually a hardware problem, but rather an expected functionality of specific installed software. In that instance, the issue may be resolved without involving a producer. The business intelligence system 100 can track such single personnel and multi-personnel transactions.

In some situations, a single employee may sometimes act as a seller, and sometimes as a producer. For example, in some IT environments individuals switch between providing telephone support and field service. These separate functions, in one embodiment, are tracked separately, even if performed by the same person.

Figure 5:
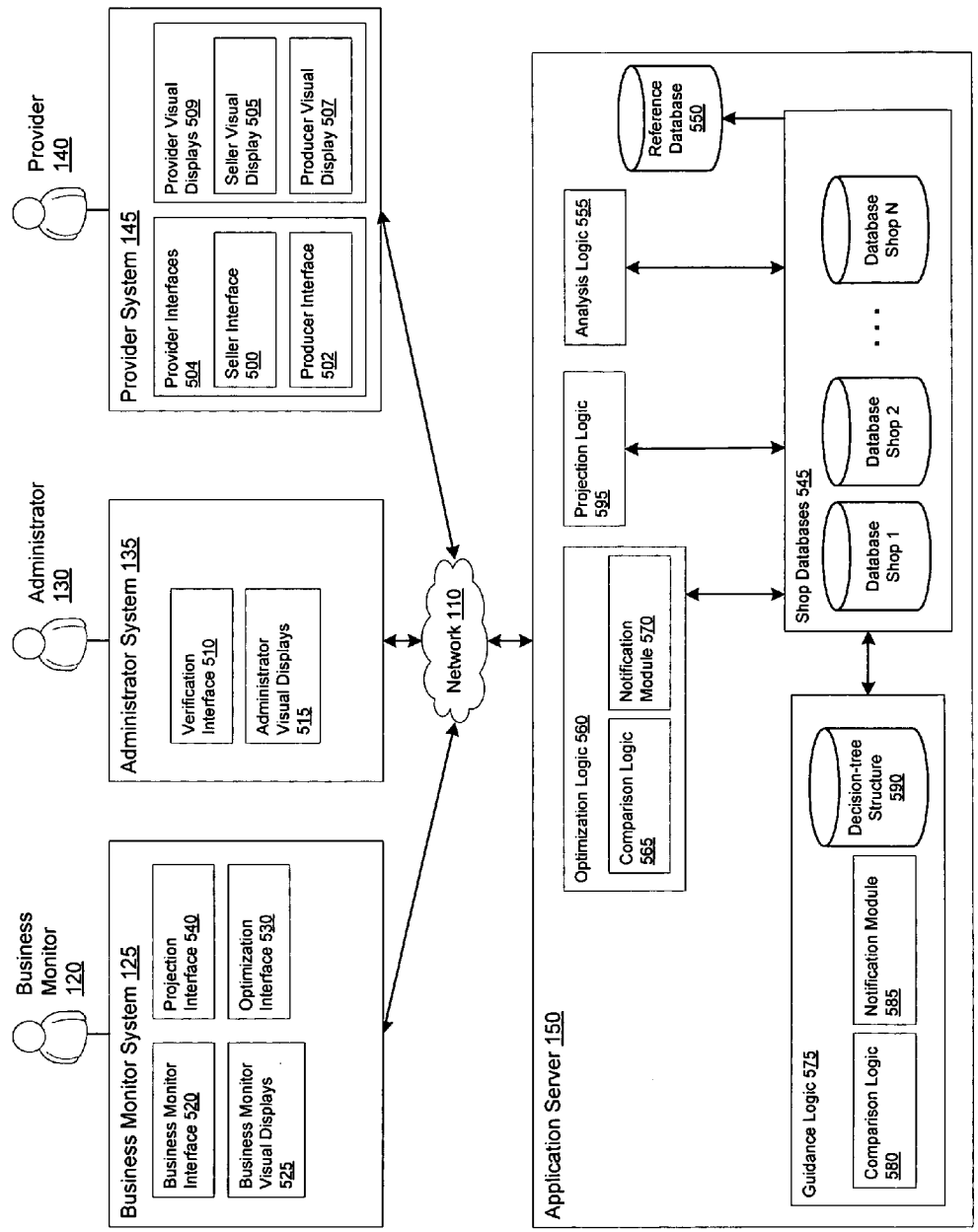
FIG. 5 is a block diagram of one embodiment of the business intelligence system.

FIG. 5 is a block diagram of one embodiment of the business intelligence system. In one embodiment, the business intelligence system includes client applications for a business monitor system 125 an administrator system 135, and a provider system 145. The client systems are coupled to an application server 150 through a network 110. The business intelligence system 100 described here may be used in any number of different businesses and industries, as described above. However, for simplicity, the examples used for the remainder of this application will be with respect to the automotive industry.

The business intelligence system 100 includes a user interface and visual display for several types of users. In one embodiment, there are user interfaces and visual displays for a business monitor 120, an administrator 130, and providers 140.

In one embodiment, the provider system 145 includes provider interfaces, such as a seller interface 500 and a producer interface 502 to enable designated personnel to input data. For example, a service advisor uses a seller interface 500 to input automotive work sold to a customer in pseudo-real-time and a service technician uses a producer interface 502 to input automotive work completed on a customer's vehicle in pseudo-real-time. The term pseudo-real-time indicates that the system is designed to have the data input shortly after the interaction/work is completed. In one embodiment, the users are prompted to enter data about an interaction/work prior to starting the next interaction/work. Although the different interfaces target specific users in one embodiment, in one embodiment the various interfaces are available to other users. The provider system 145 further includes provider visual displays 509, such as a seller visual display 505 and a producer visual display 507 that enables designated personnel, such as service advisors and service technicians to see their relative performance and an overall business state in pseudo-real-time. Although the different visual displays target specific users, in one embodiment, the visual displays can be available to other users.

In one embodiment, the administrator system 135 can include a verification interface 510 to enable designated personnel such as an administrator 130 to verify work sold by a seller and completed by a producer. The administrator system 135 can further include administrator visual displays 515 that provide the overall business state for one or more businesses in pseudo-real-time graphical form.

In one embodiment, the business monitor system 125 includes a business monitor interface 520. The business monitor interface 520 provides a summary display 525 of an immediate identification of an overall business state for a single or multiple businesses in a graphical form.

The optimization interface 530 is used to set up notifications, and set key values. These preferences are then used by the optimization tool to determine when the system should notify designated personnel when key values are outside a set of boundaries. For example, the optimization tool can notify a business monitor 120 and an administrator 130 when the business is running sub-optimally. This may be the result of a specific service technician performing below their goal, a sales tech not selling a high enough percentage of work available or other factors.

For one embodiment, the application server 150 includes one or more business databases 545, and a reference database 550. One of skill in the art understands that the business database 545 and reference database 550 may be distributed databases. The business database 545 receives the data entered into the seller interface 500 by the seller and the data entered into the producer interface 502 by the producer. In the example above, the seller is a service advisor, while the producer is a service technician.

For one embodiment, the business database 545 stores data for each business in separate databases. For example, an owner may own five automotive service and repair businesses, and the data for each business can be stored in a separate database. Alternatively, the data for the separate automotive businesses can be stored in single database. For another embodiment, the data for businesses can be stored in separate databases based on geographic region. For example, an owner may own three automotive service and repair businesses located in southern California and two automotive businesses in northern California. The data for the businesses can be stored in two separate databases, one for southern California and one for northern California. In one embodiment, businesses may share a single business database 545, even if they are not related. However, the data is secure, so that only authorized personnel can see the data for each business.

The reference database 550 generates baseline values for a business for comparison and evaluation of the key values. In one embodiment, the reference database 550 receives the pseudo-real-time data from each of the business databases 545 to further refine baseline values. In one embodiment, there is a reference database 550 for each region and type of business.

The application server 150 may further include one or more of the following: an analysis logic 555, optimization logic 560, guidance logic 575, and projection logic 595. As previously noted, for one embodiment, a user can access the system from a thin client, such as a web browser. On such an embodiment the various logics can reside on the application server 150. For another embodiment, the user can access the system by a thick client. Thus, the various logics can reside on the business monitor system 120, administrator system 130, or the providers system 140, on a server, or distributed between the two systems, as is known in the art.

The analysis logic 555 calculates key values for a business based on the pseudo-real-time data entered. For example, the analysis logic 555 can calculate and track the progress of the service advisor team and individual goals in hours sold. The relationship of the key values to the business's projected goals is reflected in the business monitor visual displays 525, the administrator visual displays 515, and the provider visual displays 509, as described in detail below with respect to FIG. 12.

The optimization logic 560 notifies designated personnel such as a business monitor 120 and an administrator 130 when key values get outside of set boundaries. The comparison logic 565 obtains current key values for a business and compares the current key values to set boundaries. When the current key values are outside the set boundaries the notification module 570 notifies designated personnel, such as a business monitor 120 and an administrator 130, for example by a pop-up window, email, SMS, pager alert, or one or more other notification methods. For example, the optimization logic 560 can notify a business monitor 120 and an administrator 130 when a business as a whole or a specific employee is functioning below a set percent of their goal.

The system may, in one embodiment, include a comparison logic 580 that obtains pseudo-real-time data for the business and compares it to acceptable ranges. In one embodiment, acceptable ranges are derived from reference database 550. In one embodiment, the acceptable ranges may be modified by one of more of the following: business type, business size, business location, and season. When key values for a business are outside an acceptable range, a notification module 585 in one embodiment notifies designated personnel, such as a business monitor 130, an administrator 120, or a provider 140 of detected problems. For example, the comparison logic 580 can detect that the net operating profit or productivity of the business is below expectation. The notification module 585 then notifies designated personnel of the detected problem. The business monitor 120 can then use this information to suggest corrective actions to the business.

In one embodiment, projection logic 595 processes past key values and current key values obtained by the analysis logic 555 to project the business's future performance. When a business monitor 120 uses the projection interface 540, the projection logic 595 enables the business monitor 120 to modify key business parameters to immediately see how the changes, if implemented, are likely to affect the business's future success. For example, the projection tool 595 displays how the business is affected if a service technician or service advisor is added and returns a trend of future hours sold. Likewise, the projection tool 595 projects if a business would perform better or worse in terms of profit, productivity, and efficiency if the number of service advisors is reduced.

Figure 10:
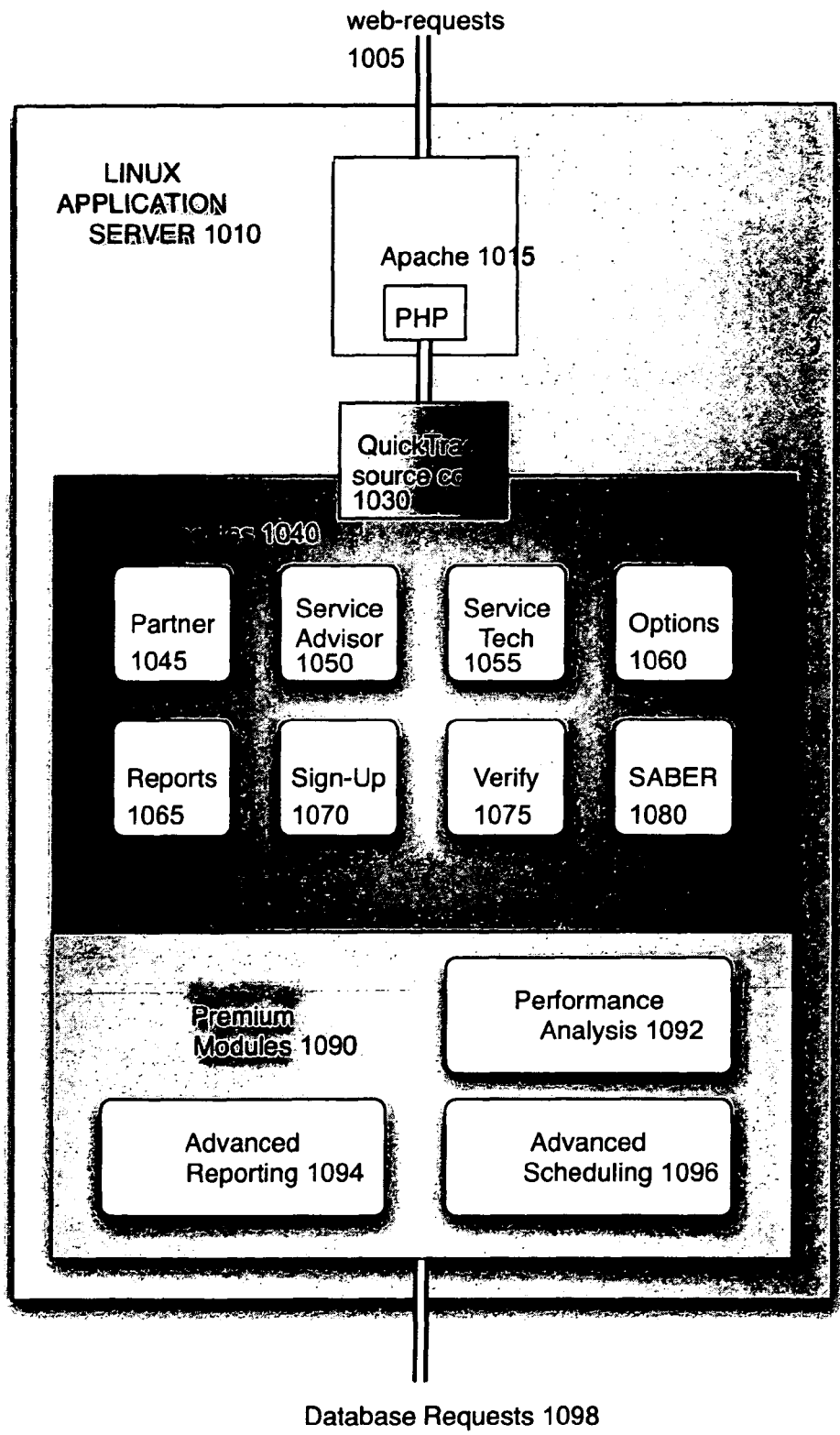
FIG. 10 is a block diagram of one embodiment of a server providing the business intelligence system.

FIG. 10 is a block diagram of one embodiment of a server-based implementation of the system. In this implementation, all of the logic is located on the server side. The system, in one embodiment, resides on an application server 1010. In one embodiment, the application server 1010 runs on a Linux Web Application server. In one embodiment, the server receives web requests 1005. These web requests are made, in one embodiment, from a web based interface provided to the system users. In one embodiment, the web interface may be a simple browser, such as the web browser supplied by Microsoft, the Mozilla Foundation, or any other group. In one embodiment, the client system is simply a system which is able to establish a secure connection with the server 1010. Thus, for example, in addition to a computer, a network-connected handheld device, even a mobile telephone, may be used as a client system.

In one embodiment, the server itself is based on the Apache web server 1015. In one embodiment, the application is written in the PHP Hypertext Preprocessor. PHP is a programming language that allows web developers to create dynamic content that interacts with databases. PHP is used for developing the web based software application.

In one embodiment, the system is split into two portions, core modules 1040 and premium modules 1090. The core modules may include modules which enable the service advice 1050, service technician 1055, reports 1065, security 1075, and partner/consultant 1045. In one embodiment, a sales and business enterprise reporting (SABER) 1080 is also included. The premium modules 1090 may include performance analysis 1092, advanced reporting features 1094, and advanced scheduling 1096. These features are described in more detail below. Of course, the split shown in FIG. 10 is merely exemplary.

The application server 1010 in one embodiment passes database requests 1098 to databases (not shown). As noted above the databases may be distributed, or may be located on application server. Responses from the database requests 1098 are routed to the correct module in the system.

In one embodiment, the present system provides a true server-side application. The application is hosted and executed on a remote server—the result of the application execution is transmitted and rendered by a client browser. Data created by the application is stored remotely, under the user's account, within their allocated storage on a database accessible through the server. In one embodiment, the system is based on a Web 2.0 Server environment. In one embodiment, there is no client-side processing within this application, with the exception of processing associated with rendering data.

Figure 6:
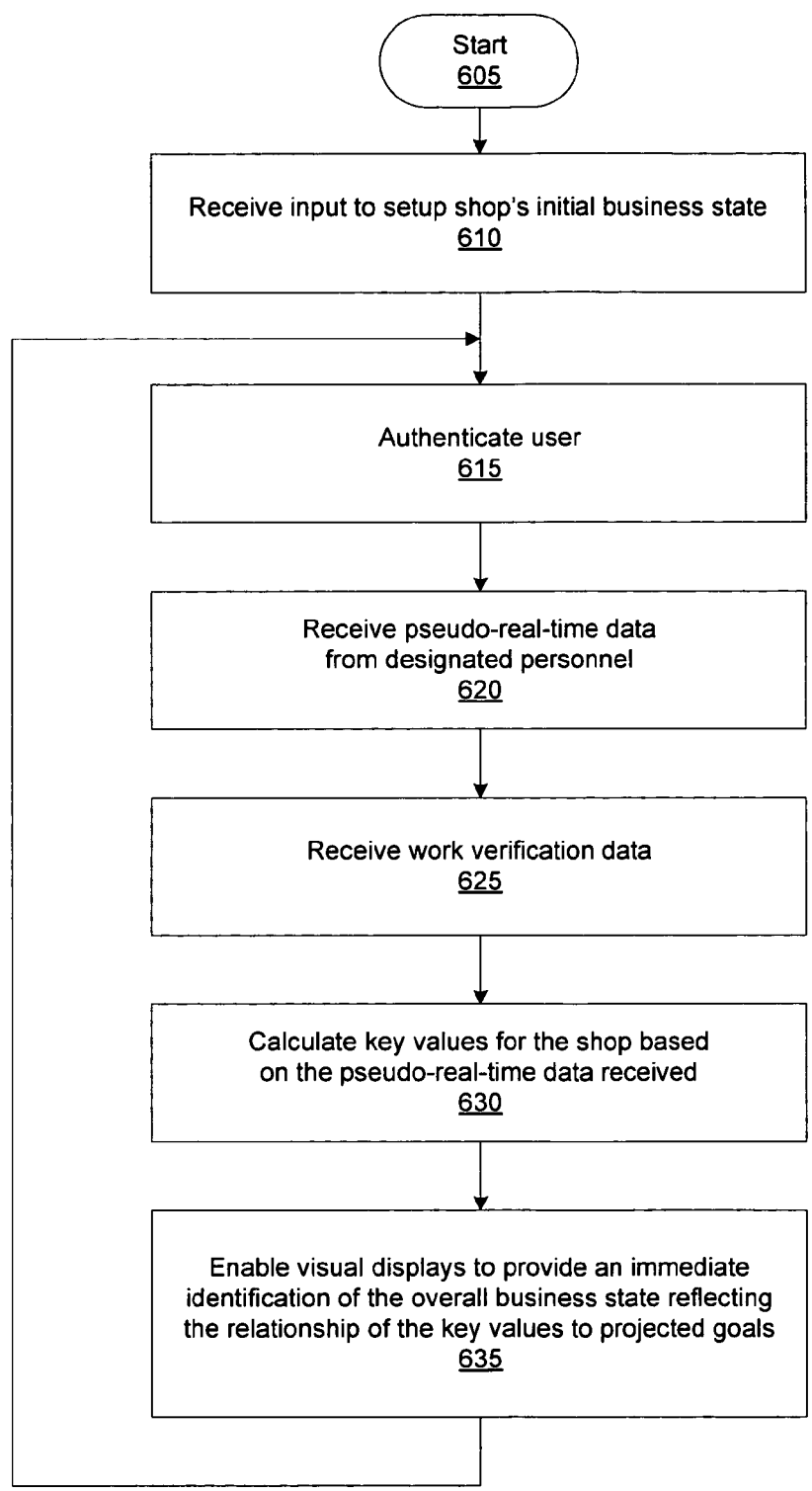
FIG. 6 is a flowchart of one embodiment of an overview of the business intelligence system.

FIG. 6 is a flowchart of one embodiment of an overview of the business intelligence system. At block 610, a business's initial business state is set up. For one embodiment, during registration, the registering agent, who may be a business monitor or other user(s), calculates individual personnel goals and team goals. For example, in the automotive industry the business monitor calculates a single service technician's personal production goal in hours per week. In one embodiment, these settings may be based on data from comparable businesses in the business database. This occurs when the business is initially registered with the system. The remaining flowchart is active when the system is in use.

At block 615, for one embodiment, the business intelligence system ensures that an accessing user is properly authenticated. In one embodiment, the system allows for various types of users to access the system with different levels of access. For example, a service technician that performs the work on a customer's vehicle can be denied authority to access the seller interface of a service advisor that sells the work directly to the customer. Similarly, a service advisor may not have the same access as a business monitor to the optimization tool and projection tool.

At block 620, in one embodiment, designated personnel enter pseudo-real-time data into the provider interfaces. For example, in one embodiment, when a service advisor sells automotive work to a customer, the service advisor, using the seller interface, creates a new work order. In creating a new work order, the service advisor enters the estimated total hours of sold work and the total dollars of sold work. In one embodiment, via the seller interface, the service advisor then dispatches the sold work to a service technician. The service technician performs the work on a customer's vehicle and in one embodiment, completes the work order by entering the actual hours completed and any work that could not be billed to a customer using a producer interface.

In one embodiment, at block 625, an administrator verifies the data entered by the providers. In one embodiment, the verification should take place the same day or the next day. The purpose of verifying the work order is to ensure the data of hours and dollars in the system match the actual hours performed by a service technician and sold by a service advisor. The administrator verifies that the hours assigned by the service advisor match the hours performed by the service technicians hours worked. Furthermore, the administrator makes sure that all sold and unsold hours, upgrades, and dollars are correctly recorded. In one embodiment, after verification the data is stored in the reporting data base.

For one embodiment, at block 630, the analysis logic calculates the key values for the business based on the pseudo-real-time data entered. The analysis logic, in one embodiment, calculates and tracks the progress of the individual service advisors in hours sold. Similarly, the analysis logic calculates the progress of an individual service technician's in work completed. The analysis logic may also calculate the team progress, business progress as a whole, percentages, and averages.

At block 635, the business intelligence system enables a visual display to provide the data calculated by the analysis logic. In one embodiment, this data may include the overall business state reflecting the relationship of the key values to projected goals. The process then returns to block 615, to ensure that the user is authorized, and continues to receive new data and update the displays.

Figure 7:
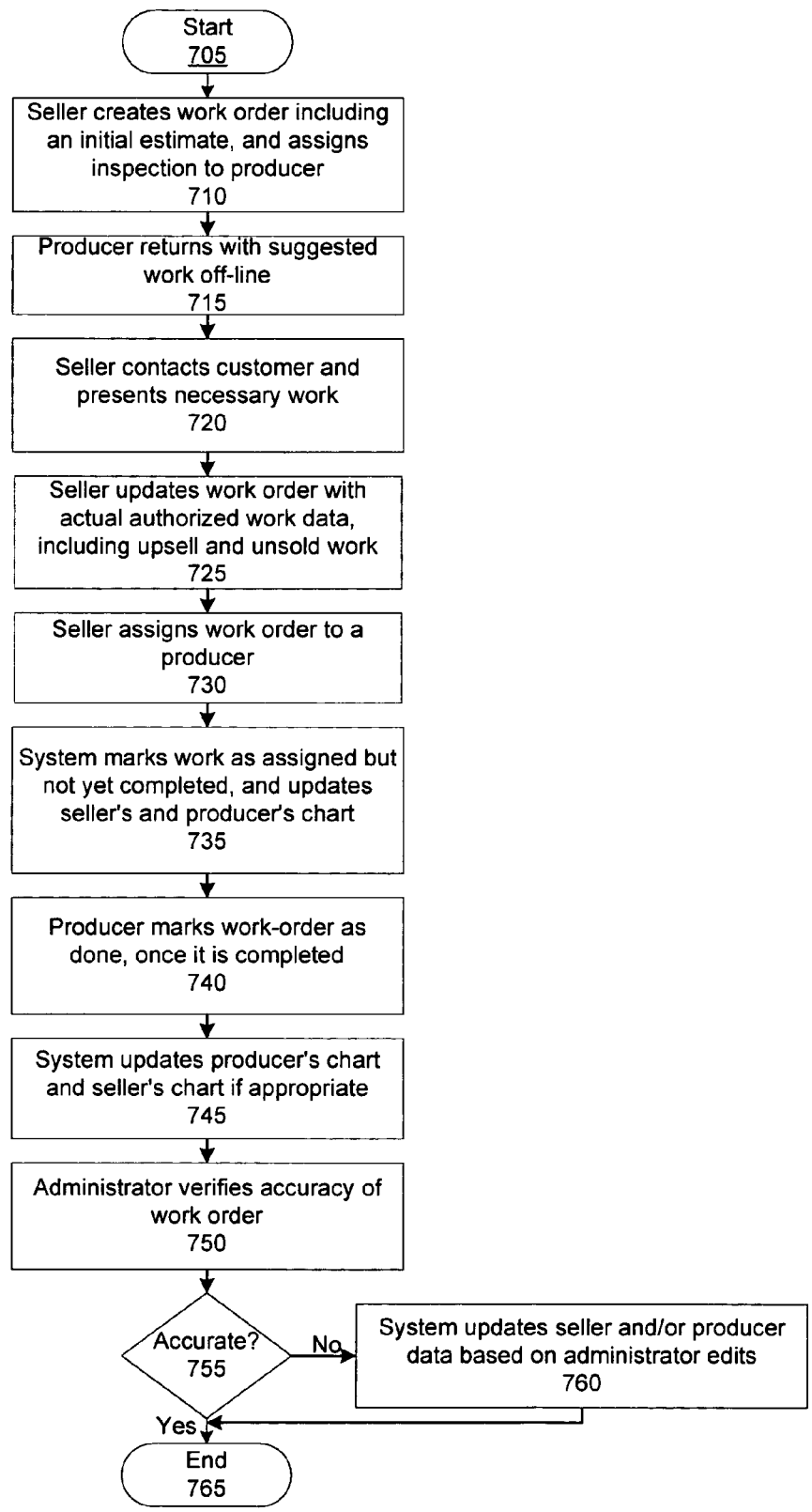
FIG. 7 is a flowchart of one embodiment of the pseudo-real time data entry into the system.

FIG. 7 is a flowchart of one embodiment of the progress of a work order through the system. At block 710 the seller creates a work order including an initial estimate. This is generated based on a conversation with the customer, in one embodiment. The seller also assigns the initial work order to a producer. In one embodiment, the producer returns with a suggested level of additional work. For example, in an automobile repair shop, the client comes in with a problem, and the service advisor writes up the initial problem/issue. The technician then inspects the car, and indicates what, if any, repairs/maintenance should be made.

At block 720, the seller contacts the customer and presents the suggested work.

At block 725, the seller updates the work order with the actual authorized work. The actual work data is the work authorized by the customer. The actual work data may include upsell—the difference between the initial estimate and the actual work data, and/or potential work—the difference between the suggested work and the actual work data. In other environments where there is no producer-cycle—anywhere that does not require an initial inspection to determine what needs to be done—upsell and potential work may be estimated on a different basis. For example, in an IT context, ordering upgrades to the system such as a bigger hard drive or new larger memory instead of repairing the existing system with original parts may be considered upsell. Alternatively, only upgrades ordered after prompting from the IT persons may be considered upsell. Alternatively, current "specials" may be considered the upsell. In one embodiment, these concepts may be eliminated for situations where there is no such interaction between the customer and the seller or producer.

At block 730, the seller assigns the work order to a producer. In one embodiment, the seller can see the current status of each of the available producers. The seller can assign the work based on the producer's skills, and based on current load on that producer. For example, if a producer already has six hours of assigned, but not yet performed, work, it may not be a good idea to assign additional work to that producer.

At block 735, the system marks the work as assigned, and updates the charts of the seller and producer. The producer's chart now reflects the completed work as well as the additional assigned but not yet completed work, while the seller's chart reflects the additional sold hours.

At block 740, the producer marks the work as completed, once he or she has performed the work. The producer may alter the work order, to put in the actual time spent on the project.

At block 745, the system updates the producer's chart. The work order is now shown as completed. In one embodiment, if the producer altered the work order, in addition to marking it done, the seller's chart is also updated to reflect the actual hours/dollars represented by the work order.

At block 750, the administrator verifies the accuracy of the work order. In one embodiment, the administrator reviews the work order within a short period of its completion.

At block 755, the process determines whether the work order is accurate. If the work order has any inaccuracies, the administrator may edit the work order to match actual data. The system then updates the producer and seller's charts, based on the corrected work order data. The process then continues to block 765. If the work order is accurate, the process ends, at block 765. This work order has gone through its cycle, and its data is reflected in the seller, producer, and business charts. Data is then transferred to reporting database.

Figure 8:
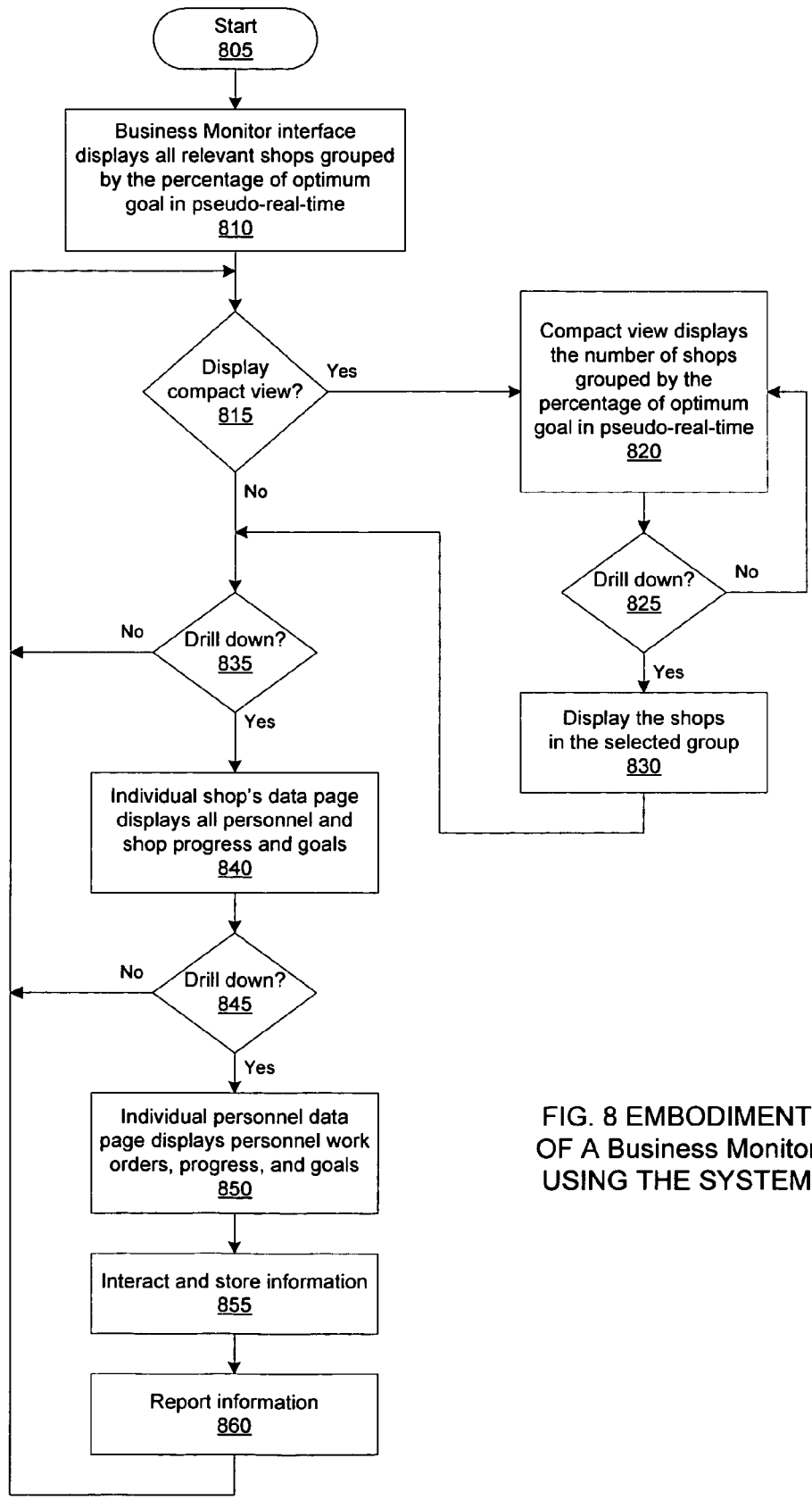
FIG. 8 is a flowchart of one embodiment of enabling a business monitor to use the business intelligence system.

FIG. 8 is a flowchart of one embodiment of enabling a business monitor to use the system. In one embodiment, at block 810, the business monitor interface displays all of the relevant businesses grouped by the percentage of the goal reached in pseudo-real-time. As noted above, the term "business monitor" includes multiple levels. In one embodiment, the business monitor may include an administrator, manager, supervisor, coach, shop, and/or owner. A business monitor sees all of the data relevant to that business monitor. So for example a coach who has ten shops as clients would see the data for each of the ten shops, categorized. For example, the businesses may be grouped into three categories: 0-60%, 60-80%, and 80% or above of optimum goal reached based on the most current information available. As noted above, this may be the pseudo-real-time information entered by providers. FIG. 26 is an embodiment of the business monitor interface.

At block 815, in one embodiment, the business monitor can select to display a compact view. Selecting the compact view creates a very succinct and small display. In one embodiment, the display is a small window which is set to always-on-top display, in a preset location on the screen. In one embodiment, the location is the upper right corner of the monitor. If a compact view is selected then in one embodiment at block 820, the compact view continuously displays the number of businesses in each group based on the percentage of optimum goal in pseudo-real-time. FIG. 28 is an embodiment of the compact display.

At block 825, in one embodiment, the business monitor can further drill down. If the business monitor chooses to drill down, at block 830, the system displays the list of businesses in the selected group. FIG. 29 is an embodiment of the compact display listing the businesses in a particular group. If the business monitor chooses not to drill down, the process returns to block 820, to continue displaying the compact view. Once the user has drilled down, at block 830, the process continues to block 835.

If, at block 815, the user did not choose to display the compact view, the process continues to block 835.

At block 835, the user can once again choose to drill down. If the user does not choose to drill down, the process returns to block 815. If the user chooses to drill down, the process continues to block 840.

At block 840, in one embodiment, an individual business's data page that displays all of the personnel and business progress and goals is displayed to the user. FIG. 27 is an embodiment of the individual business data page.

At block 845, in one embodiment, the business monitor can drill down further to view an individual personnel data page that displays the personnel's work orders, progress and goals. If the user does not choose to drill down, the user once again has the choice to select the compact view, at block 815. If the user chooses to drill down, at block 850 the selected individual personnel page is displayed. For example, the business monitor can click on a specific service technician's name or bar graph to access the service technician provider interface. An example of the individual personnel page is shown in FIG. 15. In one embodiment, a business monitor only has read-only access to the personnel page data. The business monitor may review the work history of a specific service technician or service advisor but cannot make any changes.

In one embodiment, at block 855, the business monitor can interact with and store any information viewed. Note that while this is illustrated at this location in the flowchart, this functionality may be available at any time. In one embodiment, the flowchart is only shown for convenience, and the user may arbitrarily move among the display levels and formats.

For one embodiment, the business monitor can take a snapshot of the work history displayed for a provider or for the entire business. In one embodiment, the business monitor can specify the length of time for the snapshot. In one embodiment, the snapshot includes data from the past week.

In one embodiment, the business monitor can also access an email template to communicate with an administrator or other personnel. For example, a business monitor may email an administrator to discuss the performance of a specific service technician and attach a snapshot of the service technician work history. In one embodiment, the business monitor can also do one or more of the following: create a history log with snapshot capability, send reminders, send mass emails, or send email to a select group of businesses for a particular geographic area, business type, performance percentage, or a specific number of service technicians.

In one embodiment, at block 860, the business monitor can also do one or more of the following: report information by printing log entries, send warnings of changes in performance or deviations from goals, track trends over any period. Trends may include individual sales, items provided/serviced, possibility of sale, or baseline numbers. For example, the business monitor can track the trend of a specific service advisor's sales at a particular automotive business for a period of time. In one embodiment, the business monitor can specify the length of time for the report. In one embodiment, the time period can range from a week, to over a year. In one embodiment, reports for the entire time that a business has been part of the system may be generated.

Figure 9:
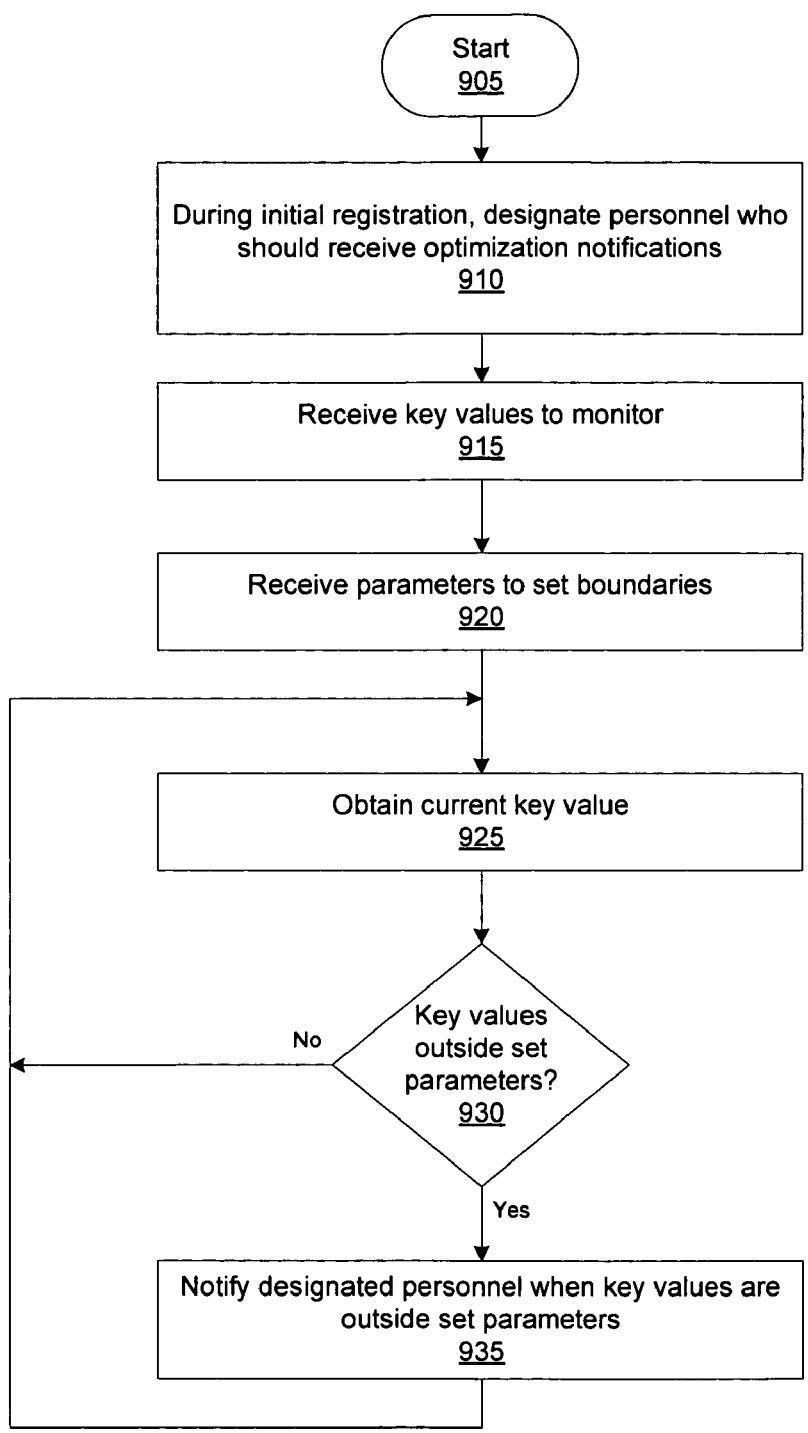
FIG. 9 is a flowchart of one embodiment of enabling a business monitor to use the optimization tool.

FIG. 9 is a flowchart of one embodiment of enabling a business monitor, or other authorized user, to use the optimization tool. For one embodiment, the optimization tool notifies a business monitor and/or an administrator when the business as whole, service teams, and/or individual employee is performing below their goal. This notification may be referred to as an alert business condition (ABC).

For one embodiment, at block 910, during the initial registration, designated personnel that should receive optimization notifications are identified. In one embodiment, a business monitor and/or an administrator can be identified to receiving optimization notifications. In one embodiment, during the initial registration, the form(s) of the notification for each notified individual is set up. Notification may be via email, pop-up window, short message service (SMS), multimedia messaging, instant messaging (IM), fax, and/or any other format.

At block 915, in one embodiment, the key values for a business to monitor are identified. Each business has one or more key values, which will indicate how well the business is doing overall. For example, in an automotive repair shop, the key values may include car count, up-sell percentage, and the corresponding profit margins, and performance levels of personnel. In the IT business, the key values may include number of customer calls, the number of calls requiring field support, the time taken to solve each issue, the number of calls involving warranty work, and the upgrades sold by the producers and sellers.

At block 920, in one embodiment, the system receives the parameters to set boundaries. For example, in one embodiment, the system can monitor when an individual service technician is performing below 60% or above 100% of their individual daily goal, a car count under 30 or over 60, an up-sell percentage under 20% or over 80%, etc. At this point, the set-up process is completed. The optimization tool is run, as shown in blocks 925-935.

For one embodiment, at block 925, the system obtains current key values for a business. In one embodiment, the current key values are based on the pseudo-real-time data entered by the providers. In another embodiment, the current key values are based on the verified values, rather than the raw data.

In one embodiment, at block 930, the comparison logic compares whether the key values are outside the set parameters.

For one embodiment, at block 935, if the key values are outside set parameters, the system notifies the designated personnel, depending on preferences. For example, the optimization tool can notify a business monitor and/or an administrator when an individual service technician is performing below a set percentage of their individual daily goal. In one embodiment, for example, the notification can communicate that a specific service technician is not getting enough of his or her assigned work done, or that not enough work is available. In one embodiment, this notification may be turned off. The process then returns to block 925, to continue monitoring the data.

FIG. 11 is a flowchart of one embodiment of enabling a business monitor, or other authorized user, to use the projection tool. For one embodiment, the projection tool enables a user to modify key business parameters to immediately see how the changes, if implemented, are likely to affect a business.

In one embodiment, at block 1110, the projection tool authenticates a user as having the appropriate level of access.

In one embodiment, at block 1115, the projection tool enables a user to adjust one or more data elements for the projection. For example, for a particular automotive business, Frontstreet Auto Repair, characteristic A can be the number of service advisors, e.g. five service advisors, characteristic B can be a car count, and characteristic C can be an average up-sell of 10%. One or more of these characteristics—or any other available characteristics—may be adjusted by the user.

In one embodiment, at block 1120, the projection tool obtains past key values from the business itself, and values from other equivalent places. For example, additional values can be obtained from the databases of other businesses.

In one embodiment, at block 1125, the projection tool obtains current key values from the business being evaluated. As noted above, these key values may be the pseudo-real-time values entered by the producers, or may be the verified values, verified by an administrator.

In one embodiment, at block 1130, the projection tool calculates the projected changes to current values based on the changes in the conditions being evaluated by the business monitor.

In one embodiment, at block 1135, the projection tool shows projections based on the changes. For example, the projection tool can provide a visual display in graphical form of how the business is affected by reducing the number of service advisors from five to three. In the above example, Frontstreet Auto Repair may perform better or worse in terms of profit with three service advisors rather than five service advisors. Thus, for one embodiment, the projection tool can be used to identify conditions which will produce optimum values for A, B, and C, or possibly an optimum relationship between these values, before implementing any actual changes to the business. The process then ends at block 1140.

FIG. 12 is a diagram illustrating one embodiment of the relationships between the various interfaces and displays for a business monitor, an administrator, and a provider. In one embodiment, authorized users can access the pseudo-real-time data entered at any time. Although the business intelligence system includes a number of different interfaces and visual displays targeting specific users, for one embodiment, each of the interfaces and visual displays can be made available to other users.

In one embodiment, providers can view their progress in reaching their individual goals and observe how they are currently contributing to the overall team and business goals in one or more several types of visual displays. In one embodiment, the administrator visual displays 1260 and the provider visual displays 1285 include one or more of the following: the overall business state of a business, the compact display of the overall business state, and the employee performance display. In one embodiment, providers can use the provider interfaces, such as a seller interface 1275 and producer interface 1280, to enter pseudo-real-time data. For one embodiment, administrators can use the verification interface 1250 to verify the data entered by the providers.

In one embodiment, the business monitor visual displays 1230 include one or more of the following: the overall business state of one or more businesses, the compact business monitor display of the overall business state, and the relative employee performance display. For one embodiment, the business monitor can view the display and interact with the data via the business monitor interface. In addition, for one embodiment, a business monitor can access one or more of the following: the troubleshooting tool via the troubleshooting interface 1220, the optimization tool via the optimization interface 1215, and the projection tool via the projection interface 1225.

In one embodiment, each of the interfaces has a messaging interface 1212, 1252, and 1277 to enable messages to be sent between the various interfaces. In one embodiment, messages may include instructions, completion messages, as well notifications or alerts from a business monitor. In one embodiment, the messaging system 1212, 1252, and 1277 has the capability of capturing data and utilizing that in a message. In one embodiment, the data capture may be a screen shot. In another embodiment, the underlying data may be saved instead of, or in addition to the screen shot. In one embodiment, the messaging system 1212, 1252, and 1277 also includes message templates. The message templates, in one embodiment, are customized for the user type. In one embodiment, a message template may include an automatic screen shot. For example, a message template may state something like "Joe, your shop seems to be doing worse with more customers per day. Let's talk." The system may then automatically append a screen shot appropriately illustrating the template. In one embodiment, the system further includes the ability to go back through messages, as well as set reminder timers. The reminder timers may be used to review previously sent messages, and compare the current data with the data associated with the message (based on the saved data). This enables the sender to see if improvement was made after the message was sent, and to follow up.

In one embodiment, troubleshooting interface's functionality varies by the user. Troubleshooting interface 1220 for the business monitor and the troubleshooting interface 1254 for the administrator provide a method of analyzing the overall business performance, and determining how to improve it. In one embodiment, the troubleshooting interface 1220, 1254 provides a decision tree which guides the user to determine the cause of the business problems.

In one embodiment, the provider interface also includes a trouble shooting interface 1282, which provides information to the provider about his or her own performance, and how to improve their performance. In one embodiment, the trouble shooting interface 1282 for the provider simply indicates which aspect of their work needs improvement—i.e. taking on too much work & not doing enough of it, keeping projects too long, not taking on enough work, etc.

Exemplary User Interface Images

FIGS. 13-29 are screen shots of an exemplary implementation of the above process, in the context of an automobile repair shop. One of skill in the art would understand how to alter the specifics shown here to enable the use of the system with various other types of businesses.

FIG. 13 is a screen shot of an embodiment of one of the provider visual displays, the seller interface. The seller interacts with a customer, and takes orders. For example, in the automotive industry, service advisors interact with the customers, and discuss what work should be performed by a service technician on the customer's vehicle. The service advisor inputs the sales data into the seller interface. The sales data may include sold and unsold hours and dollars.

In one embodiment, the display of FIG. 13 can include the service advisor's individual and team progress to projected goals. In one embodiment, the individual service advisor's progress to projected goals can display one or more of the following: the service advisor's daily goal in hours 1305, progress percentage 1310, and a graphical color coded bar graph 1315. For one embodiment, the left of the bar graph 1315 can show the number of hours sold 1320. In one embodiment, a bar graph 1315 can show the number of hours the service advisor still needs to sell in order to meet the goal 1325. For one embodiment, the bar graph 1315 is color coded to show at a glance how the sales advisor is doing. In one embodiment, the color coding shows red as a warning sign (in one embodiment under 60% relative to the goal), yellow as questionable (in one embodiment 60% to 80% relative to the goal), and green as good (in one embodiment 80% to 100% relative to the goal) and dark green above 100% of goal.

In one embodiment, the display of FIG. 13 can provide the service advisor with a daily view of all of the service technicians' performance 1330 at a glance. In one embodiment, the daily bar graph showing the performance 1340 for each service technician contains three portions. In one embodiment, the leftmost part shows the service technician's completed time, next is assigned time 1322, and last is time to goal or available production time 1324. In one embodiment, these segments may be separated by separator bars 1335. In one embodiment, they may simply be separated by color.

In one embodiment, the display of FIG. 13 can include a column 1350 that displays overall business state. The overall business state may include one or more of the following: the productivity rate, car count, and average hours per work order. For one embodiment, the productivity rate shows the percentage of how much work each service technician has completed at that point in time to meet their goal for the day. For one embodiment, the productivity rate can be color-coded, as noted above. For one embodiment, the car count shows how many work orders the service technician had assigned that day. For one embodiment, the average hours per work order shows the average value per car. In one embodiment, the display of FIG. 13 can include boxes to display work orders. In one embodiment, assigned work orders 1355 can include active, completed, verified, and deleted work orders.

FIG. 14 illustrates an embodiment of the service advisor using the seller interface to update a work order 1400. For one embodiment, the service advisor can enter a new work order number to create a work order 1410. A new work order includes an initial estimate for hours of work and dollars sold and AD code (advertising code, indicating which form of advertising brought in the client). After that, a technician inspects the car, and determines the actual amount of work that should be done. The service advisor then contacts the customer, and gets authorization to determine the final hours of work and dollars sold. The actual total number of hours of work and total dollars sold 1420 are entered into the form any non-billable time. This determines the upsell (the positive difference between the initial estimate and the actual sold hours) or potential work (the total available to sell). For one embodiment, the service advisor can then dispatch and assign the work 1430 to a service technician. In one embodiment, the service advisor can view the work order transaction history.

FIG. 15 is a screen shot of an embodiment of another type of provider interface, the producer interface. For example, in the automotive industry, after a service advisor receives authorization for a repair from a customer, the service advisor dispatches the work order to a service technician. The service technician performs the work on the customer's vehicle. Upon completing a job, the service technician enters the data. The service technician producer interface 1500 allows for pseudo-real-time data tracking. In one embodiment, the center of the service technician producer interface 1500 includes the edit work order box 1510. For one embodiment, this box can allow the service technician to perform one or more of the following: enter the number of hours worked for that particular work order, enter non-billable time, or mark a work order as complete. For one embodiment, non-billable time is any time a technician works, but a customer is not charged. This may include warranty work, for example. As can be seen, the service technician interface also shows the service technician's goals. In one embodiment, the display may also show the overall business state. The color coding, described above, may be used, to provide an easy view of the status of the service technician.

For one embodiment, the interface displays the work history 1515. For one embodiment the interface can display one or more of the following: the hours, daily goal, and the percentage (%) of the goal reached. For example, the hours column 1520 contains the number of hours completed for each day and the daily goal 1525 column shows the daily goal hours for the service technician for each day.

For one embodiment, the daily goal column can display production time in a color-coded bar graph 1530. For one embodiment, the left of the line separator, the bar graph can show work completed 1535 for a particular day. For one embodiment, the bar graph can be color coded, as described above. For one embodiment, pink can represent non-billable time. For one embodiment, the right of the line separator the bar graph, grey can represent the required for a service technician to meet their goal 1540.

For one embodiment, the percentage column 1545 can show the percentage of hours completed towards the service technician's goal for that day. In one embodiment, a workweek history 1515 can be displayed. In another embodiment, another unit of time, such as two weeks, five days, etc. may be shown. In one embodiment, a user can scroll over any day in the work week history box 1515 to see a dialogue box 1550 that lists work orders completed by the service technician for that day. In one embodiment, the dialogue box 1550 can also inform a user how many hours are assigned for the work order. For one embodiment, a line through the work order represents completed work orders.

FIG. 16 is a screen shot of an embodiment of the administrator verification interface. For one embodiment, an administrator is responsible for verifying the hours sold by a service advisor 1605 with the hours completed by a service technician 1610. In order for the system data to be accurate and up-to-date, for one embodiment, an administrator verifies each work order. In one embodiment, it is suggested that the administrator perform the verification on the same day a work order is completed by a service technician or by the next day. For one embodiment, if the work order hours created by a service advisor do not match the work order hours completed by a service technician, the administrator can correct any data errors by modifying the hours using the editing function 1615. FIG. 17 illustrates an embodiment of an administrator editing some details about of the work sold and unsold 1705 by the service technicians, including upgrades. For one embodiment, administrators ensure that all work, including upsell and unsold work is accurately recorded because this data is key for determining overall performance of the business used for generating reports used for indicating trends.

FIGS. 18-20 are screen shots of an embodiment of the main business display and service technician display. For one embodiment, when a service technician logs into the system, the user will see the service technician service display 1800. In one embodiment, the main business display includes information on how all of the service technicians are performing towards their individual goals 1805 and how the service technicians are contributing to the overall team goals 1810.

For one embodiment, the display can include a compact link 1815. Selecting the compact view compresses the display and moves it to a preset location. In one embodiment, the location is the upper right corner of the monitor. In one embodiment, the compact view displays the business's progress towards goals as illustrated in FIG. 25.

For one embodiment, the main business display can include a login link 1820 to allow authorized personnel, such as a business monitor, administrator, or provider to become authenticated in order to access the system. For example, in one embodiment, a business monitor can log in from the main business display 1800 and view the business monitor interface. FIG. 26 illustrates one embodiment, where the business monitor interface can display all of the service advisors' and service technicians' progress toward their goals, as well as the total business goals and progress.

In one embodiment, the main business display 1800 can also act, by default, as the service technician display 1800. In one embodiment, the main display 1800 can display the service technician individual and team progress to projected goals.

FIG. 19 details one embodiment of the service technician team progress. In this particular embodiment, the numbers can represent calculations for a period. The period may be one pay period, one week, one day, or any other unit. In one embodiment, the display can include the service technician team goal as a total number of hours 1905. For example, in FIG. 19 the service technician team goal is 234 hours. In one embodiment, the display can also include the hours the service technician team should have completed at the time the display is viewed to reach the service technician team goal 1910. In one embodiment, the actual total hours produced by the service technician team is also shown 1915. In one embodiment, the actual hours produced can also be displayed in bar graph form 1920. In one embodiment, the hours left to be completed by service technician team to reach goal 1925 can be included. For one embodiment, the assigned hours which have not yet been completed 1930 can be displayed in bar graph form. For one embodiment, the display can further include the number of hours the service technician team produced 1935 and/or the average hours produced per work order 1960. In one embodiment, the display can project the hours the service technician team will produce if the present rate of production is maintained 1965.

FIG. 20 details an embodiment of the main display showing individual service technicians' progress and averages.

The numbers represent calculations for one period, as discussed above. For one embodiment, the display includes color-coded bar graphs for each service technician. In one embodiment, a particular color can represent the percentage of optimum goal reached in pseudo-real-time. Color coding, as discussed above, may show the relative level of performance for each technician. In one embodiment, an additional bar 2020 shows an average. Symbols within the bar graph may also represent level of output attained.

In addition, in one embodiment, each bar graph can display the number of hours produced by a specific technician 2025. For one embodiment, each bar graph can also display the assigned hours left for a specific technician to produce 2030. For example, in this illustration, service technician Bob Davidson has produced is 47.8 hours and has 3.0 hours left of assigned work to complete. Bob Davidson is averaging 2.3 hours worked per work order 2035.

For one embodiment, the far right column is a bar graph 2020 that can represent and can include one or more of the following: the average hours produced by the average service technician 2040, the average assigned but not completed hours left for the average service technician 2045, and the average work order produced by the average service technician 2050. In one embodiment, bar graph 2020 is blue.

FIG. 21 is a screen shot of an embodiment of the service advisor team performance display. In one embodiment, a service advisor can click the login link 1820 from the main business display shown in FIG. 18 to login as a service advisor. In one embodiment, logging in as a service advisor grants a user access to the service advisor team performance display.

Returning to FIG. 21, in one embodiment, the service advisor team performance display can consist of one or more sections that display the individual service advisor's performance 2105, the service advisor team progress 2110 to projected goals, and the service technician team performance 2115. For one embodiment, when logged in as a service advisor, the service advisor can view the data either in hours by clicking display hours or in dollars by clicking display $$$ 2120. In one embodiment, a simple color interface shows the performance level for each service technician. In this example, the colors are red (less than 59% of goal), yellow (between 60% and 80% of goal), light green (between 80% and 100% of goal), and dark green (over 100% of goal). Of course, the colors, and the amounts they represent may be varied. In one embodiment, the system set-up may set these colors and percentages to optimize usefulness for the business.

In one embodiment, at anytime from the service advisor team performance display 2100, a service advisor can click the compact link 2125 to create a compact view, as discussed above.

FIG. 22 details an embodiment of the service advisor team progress. The numbers represent calculations for one period. In one embodiment, the period for the service advisor team matches the period for the service technician team. Alternatively, the display may be over different periods. In one embodiment, the display can include the service advisor team goal 2205. In one embodiment, the display can also include the optimal number of hours the service advisor team should have sold to date to reach the service advisor team goal 2210. In one embodiment, a user can also view the actual total hours sold by the service advisor team in pseudo-real-time 2215 and the additional hours that need to be sold to reach goal 2220. For one embodiment, the display can further include one or more of the following: the average hours sold per work order 2225, the number of hours unsold by the service advisor team 2230, and the percentage of work sold by the team of the total sale opportunity 2235. In one embodiment, the service advisor team performance display can project the hours the service advisor team will produce if the present rate of sale is maintained 2240. For one embodiment, the car count 2245 can track the total number of cars serviced by the automotive business to this point in the defined period.

FIG. 23 details an embodiment of each of the service advisors' progress and averages for the service advisor team. The numbers represent calculations for one period, as discussed above. For one embodiment, the display includes color-coded bar graphs for each service advisor. In one embodiment, a particular color can represent the percentage of optimum goal reached in pseudo-real-time, as discussed above.

In addition, for one embodiment, each bar graph can display the number of hours sold by a specific advisor 2320 and the average hours of unsold work 2325. For example, in FIG. 23, service advisor Rick Housholder has 129.1 hours sold and has an average of 27.5 hours of unsold work. Rick Housholder is averaging 2.7 hours sold per work order 2330. In one embodiment, the percentage of work sold per work order 2330 is displayed in a pop-up window.

For one embodiment, the far right column can be an average bar 2315 that can represent one or more of the following service advisor team averages: the average hours sold by the average service advisor 2335, the average hours unsold for the average service advisor 2340, and the average hours sold by the average service advisor 2345. In one embodiment, average bar 2315 can be blue.

FIG. 24 details an embodiment of the service advisor display showing the performance of the service technicians. In one embodiment, a service advisor can view the actual hours produced by all of the service technician team members in bar graph form 2405 and the assigned hours left for technicians to produce 2410 in bar graph form. This is used by the service advisor, in one embodiment, to determine overall team progress towards the set goal. For one embodiment, the display can include color-coded bar graphs for each service technician. In one embodiment, each bar graph can display the number of hours produced by a specific technician to date 2415 and the assigned hours left for a specific technician to produce 2420. In one embodiment, the display can include one or more of the following: a bar graph 2425 that can represent the service technician average hours produced and a number above the bar graph that can represent the average assigned hours left for service technicians 2430. In this particular illustration, there are six service technicians that are producing an average of 30.0 hours and have an average of 3.4 hours of assigned work remaining.

FIG. 25 is a screen shot of an embodiment of a compact view identifying the overall business state. The compact view gives easy access for fast reopening of the application and a macro view of the real-time progress towards the goals. In one embodiment, administrators can leave the compact view displayed on the screen to monitor the business's progress. By viewing the compact display, an administrator can quickly see the hours produced and hours sold by the business.

For one embodiment, the team goal of hours produced 2505 can be displayed. In one embodiment, an indicator 2510 can point to the number of actual hours produced in pseudo-real-time. In one embodiment, the compact display can include a color-coded display 2515 to illustrate the state of the business. For example, in FIG. 25, green 2520 can represent the business is operating above 80% of their optimum goal, yellow 2525 can represent the business is operating at 60-80%, and a red 2530 can represent the business is operating at 0-60%. In this particular illustration, an administrator can see that the business is operating at 0-60% from the arrow pointing at 181.7 hours in the red area. From this information, in one embodiment, an administrator can assess whether further investigation is necessary to detect problems and identify corrective steps, as discussed above. In one embodiment, the actual number of hours produced in pseudo-real-time can be displayed in numerical form 2535.

In addition, for one embodiment, the number of hours that should have been produced in order to reach the production goal 2540 can be displayed. In one embodiment, the compact view can display the average production hours per work order 2545 and the projected hours 2550 the team will produce by the end of the period if the present rate of production is maintained.

For one embodiment, an administrator can also view the service advisor team data. In one embodiment, the compact view can display the actual hour sold in pseudo-real-time in one or more of the following forms: an indicator 2555 or in numerical form 2560.

FIG. 26 is a screen shot of an embodiment of the business monitor interface that displays all of the businesses a business monitor is monitoring grouped by the percentage of the goal reached in pseudo-real-time. Depending on the number of businesses the business monitor is viewing, in one embodiment, the interface may or may not display all of the businesses on a single page. In one embodiment, there are separate groupings for businesses based on performance. In one embodiment the boxes are outlined in green 2605, yellow 2610, and red 2615, representing each business' performance 2620. In one embodiment, each box can list the businesses 2625 operating at that particular percentage range.

In one embodiment, each business name is followed by a percentage 2630 of their goal completed at that particular point in time, in relation to their goal at that particular point in time. For example, in this particular illustration, the green box is the category for businesses operating at 80% or above of the goal reached in pseudo-real-time. To view the details of a specific business, in one embodiment, the user can click on a business name 2625. This is termed drilling down. In one embodiment, to view the compact business monitor display, the business monitor can click the compact link 2635.

FIG. 27 is a screen shot of an embodiment of the business monitor interface, once the user has drilled down to select a particular business. In one embodiment, the interface is similar to the service advisor interface, discussed above with respect to FIG. 24.

FIG. 28 is a screen shot of one embodiment of the summary display available to the business monitor. In one embodiment, the summary display includes color-coded groupings 2810. In one embodiment, each color-coded grouping 2810 includes the number of businesses in the grouping 2815. For one embodiment, the businesses are grouped by the percentage of the goal reached in pseudo-real-time. For example, in FIG. 28, the business monitor is monitoring a total of twenty-one businesses. There are eighteen businesses operating at 0-60%, one business operating at 60-80%, and one business operating at above 80%. In one embodiment, the business monitor can view a list of businesses in a particular group by clicking such group.

FIG. 29 illustrates one embodiment of a list of businesses in a particular group 2910. In one embodiment, this display may be reached by clicking one of the groups in the summary display. This particular illustration is one embodiment where the businesses in the red color-coded group have a percentage of the goal of 0-60%. In one embodiment, each business name is listed followed by the percentage of the goal reached in pseudo-real-time 2915. The main display, shown on FIG. 28 as groups 2810, allows a user to make a choice to see a set of businesses within a group, as shown in FIG. 29. The user may further drill down by selecting a particular business, and then further to get more detailed information about the particular business. In one embodiment, the drill-down enables the user to go to any depth that is available based on the user's privilege levels.

FIG. 30 is one embodiment of a computer system that may be used with the present invention. It will be apparent to those of ordinary skill in the art, however that other alternative systems of various system architectures may also be used.

The data processing system illustrated in FIG. 30 includes a bus or other internal communication means 3020 for communicating information, and a processor 3005 coupled to the bus 3020 for processing information. The system further comprises a random access memory (RAM) or other volatile storage device 3010 (referred to as memory), coupled to bus 3020 for storing information and instructions to be executed by processor 3005. Main memory 3010 also may be used for storing temporary variables or other intermediate information during execution of instructions by processor 3005. The system also comprises a read only memory (ROM) and/or static storage device 3025 coupled to bus 3020 for storing static information and instructions for processor 3005, and a data storage device 3030 such as a magnetic disk or optical disk and its corresponding disk drive. Data storage device 3030 is coupled to bus 3020 for storing information and instructions.

The system may be further coupled to a display device 3035, such as a cathode ray tube (CRT) or a liquid crystal display (LCD) coupled to bus 3020 through bus 3060 for displaying information to a computer user. An alphanumeric input device 3040, including alphanumeric and other keys, may also be coupled to bus 3020 through bus 3060 for communicating information and command selections to processor 3005. An additional user input device is a cursor control device 3050, such as a mouse, a trackball, stylus, or cursor direction keys coupled to bus 3020 through bus 3060 for communicating direction information and command selections to processor 3005, and for controlling cursor movement on display device 3035.

Another device, which may optionally be coupled to computer system 3000, is a communication device 3055 may include any of a number of commercially available networking peripheral devices such as those used for coupling to an Ethernet, token ring, Internet, or wide area network. Not that any or all of the components of this system illustrated in FIG. 30 and associated hardware may be used in various embodiments of the present invention.

It will be appreciated by those of ordinary skill in the art that any configuration of the system may be used for various purposes according to the particular implementations. The control logic or software implementing the present invention can be stored in main memory 3010, mass storage device 3030, or other storage medium locally or remotely accessible to processor 3005. Other storage media may include floppy disks, memory cards, flash memory, or CD-ROM drives.

It will be apparent to those of ordinary skill in the art that the methods and processes described herein can be implemented as software stored in main memory 3010 or read only memory 3025 an executed by process 3005. This control logic or software may also be resident on an article of manufacture comprising a computer readable medium having computer readable program code embodied therein and being readable by the mass storage device 3030 and for causing the processor 3010 to operate in accordance with the methods and teachings herein.

The software of the present invention may also be embodied in a handheld or portable device containing a subset of the computer hardware components described above. For example, the handheld device may be configured to contain only the bus 3020, the processor 3005, and memory 3010 and/or data storage device 3030. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer implemented system comprising:
   a computer including a user interface presented on a display to provide a visual display of a business in a graphical form, the visual display providing immediate visual identification of an overall business state;
   a provider interface to enable a provider to enter work data in pseudo-real-time into the system;
   an analysis logic implemented by a processor to calculate key values for the business based on the pseudo-real-time data entered, the visual display representing a relationship of the key values to projected goals;
   a visual display associated with the provider interface, enabling the provider to see their relative performance compared to one or more other providers and an overall business state using the pseudo-real-time data;
   a troubleshooting interface to provide information to the provider about his or her own performance, and how to improve performance, in a manner to reinforce positive behavior; and
   a notification module to notify the performer of exceptional performance, or impact on overall business performance.

2. The system of claim 1, wherein the user interface provides the visual display of a plurality of businesses, and wherein the visual display groups businesses into color-coded areas based on their overall business state.

3. The system of claim 1, further comprising:
   a compact visual display to give designated personnel a macro view of the overall business state based on the pseudo real-time data, wherein the compact visual display allows for access to view the overall business state.

4. The system of claim 1, further comprising:
   a reference database used in generating baseline values for a business, for comparison and evaluation of the key values.

5. The system of claim 4, wherein the baseline values from the reference database may be modified by one or more of the following: business type, business size, business location, and season.

6. The system of claim 4, wherein the pseudo real-time data received from the business is added to the reference database to further refine the baseline values.

7. The system of claim 1, further comprising:
   a verification interface to enable designated personnel to verify validity of the data entered in the provider interface.

8. The system of claim 1, further comprising:
   an optimization logic that notifies designated personnel when a key value is outside of set boundaries.

9. The system of claim 1, further comprising:
   a comparison logic to obtain real-time data and compare the real-time data to acceptable ranges; and
   a notification module to notify designated personnel of detected problems.

10. The system of claim 1, further comprising:
    a projection logic to process past key values and current key values obtained by the analysis logic, and to project future performance.

11. The system of claim 1, further comprising:
    a business monitor interface to enable a business monitor to see the overall business state of a plurality of businesses in pseudo-real time.

12. The system of claim 11, wherein the business monitor interface further provides an ability to drill down to view additional details of the business and the key values.

13. A computer-implemented method of tracking business performance, the method comprising:
    enabling a provider to enter work data of a business using a computer in pseudo-real-time at a provider interface;
    calculating key values for the business using a processor based on the pseudo-real-time data entered; and
    providing a visual display on an output device showing a relationship of the key values to projected goals, the visual display providing immediate identification of an overall business state of the business in a graphical form; and
    giving feedback to the provider including the provider's relative performance compared to one or more other providers and the business state, wherein the other providers may perform different work functions; and
    providing information to the provider, via a troubleshooting interface, about his or her own performance, and how to improve performance, in a manner to reinforce positive behavior, including notifying the performer of exceptional performance, or impact on overall business performance, when appropriate.

14. The method of claim 13, further comprising:
    notifying designated personnel when a key value is outside of set boundaries.

15. The method of claim 13, further comprising:
    normalizing performance of a plurality of producers having different work functions, such that the relative performance shows unified value, enabling direct comparison for the relative performance.

16. An apparatus comprising:
    means for enabling a provider to enter work data of a business in pseudo-real-time into a provider interface;
    means for calculating key values for the business based on the pseudo-real-time data entered; and
    means for illustrating a relationship of the key values to projected goals in a visual display, the visual display providing immediate identification of an overall business state in a graphical form and showing the provider's performance and relative performance of the provider to others;
    a means for providing information to the provider about his or her own performance, and how to improve performance, in a manner to enforce positive behavior; and a means for notifying the performer of exceptional performance, or impact on overall business performance.

17. The apparatus of claim 16, further comprising:
means for notifying designated personnel when a key value is outside of set boundaries.

18. The apparatus of claim 16, further comprising:
means for processing past key values and current key values obtained by the analysis logic; and
means for projecting future performance.

19. A computer readable medium comprising non-transient executable instructions which when executed on a processing system cause said processing system to perform a method comprising:
enabling a provider to enter work data of a business in pseudo-real-time;
calculating key values for the business based on the pseudo-real-time data entered;
determining a relationship of the key values to projected goals, and illustrating the relationship in a visual display updated continuously based on the pseudo-real-time data, the visual display providing immediate identification of an overall business state of the business in a graphical form; and
displaying to the provider a performance of the provider and a relative performance of the provider to others;
providing information to the provider, via a troubleshooting interface, about his or her own performance and how to improve performance, in a manner to reinforce positive behavior; and
notifying the performer of exceptional performance, or impact on overall business performance.

20. The method of claim 13, wherein the relative performance is compared to: other providers with similar job descriptions, all other providers, the overall business state of the business.

21. A computer implemented method comprising:
receiving pseudo-real-time work information entered into a computer from a plurality of providers;
calculating key values based on the pseudo-real-time work information;
calculating relative performance, based on projected goals, the key values, and the real-time work information; and
displaying relative performance information to the provider, the relative performance comparing the performance of the provider to other providers;
providing information to the provider, via a troubleshooting interface, about his or her own performance, and how to improve performance, in a manner to reinforce positive behavior; and
notifying the performer of exceptional performance, or impact on overall business performance.

22. The method of claim 21, wherein the relative performance information is available to the plurality of producers, supervisors, business owners, and a business monitor.

23. The method of claim 21, wherein the relative performance information comprises one or more of: relative performance of a particular type of producer to other producers of the particular type, relative performance of a producer compared to set goals, relative performance of the business compared to set goals, relative performance of the business compared to comparable businesses, and relative performance of types of producers to each other.

24. The method of claim 22, wherein the relative performance data is normalized to compare equivalent values.

25. The method of claim 21, further comprising:
showing the performer positive feedback for outstanding performance, and the performer's own impact on the overall business performance.

* * * * *